US012092828B2

(12) United States Patent
Eash et al.

(10) Patent No.: US 12,092,828 B2
(45) Date of Patent: Sep. 17, 2024

(54) HEAD MOUNTED SYSTEM WITH COLOR SPECIFIC MODULATION

(71) Applicant: Avegant Corp., San Mateo, CA (US)

(72) Inventors: Aaron Matthew Eash, San Francisco, CA (US); Andrew John Gross, Chassel, MI (US); Edward Chia Ning Tang, Menlo Park, CA (US); Warren Cornelius Welch, III, Foster, CA (US); Joseph Daniel Lowney, Tucson, AZ (US)

(73) Assignee: Avegant Corp., San Mateo, CA (US)

( * ) Notice: Subject to any disclaimer, the term of this patent is extended or adjusted under 35 U.S.C. 154(b) by 0 days.

(21) Appl. No.: 18/296,965

(22) Filed: Apr. 6, 2023

(65) Prior Publication Data
US 2023/0375839 A1 Nov. 23, 2023

Related U.S. Application Data

(63) Continuation of application No. 17/248,049, filed on Jan. 6, 2021, now Pat. No. 11,624,921.
(Continued)

(51) Int. Cl.
G02B 27/01 (2006.01)
G02B 27/00 (2006.01)

(52) U.S. Cl.
CPC ..... *G02B 27/0172* (2013.01); *G02B 27/0081* (2013.01); *G02B 27/0101* (2013.01); *G02B 2027/0112* (2013.01); *G02B 2027/013* (2013.01); *G02B 2027/0147* (2013.01); *G02B 2027/0174* (2013.01)

(58) Field of Classification Search
CPC ............. G02B 27/017; G02B 27/0172; G02B 27/0101; G02B 2027/0112; G02B 2027/013; G02B 2027/0147; G02B 27/0081; G02B 2027/0174
See application file for complete search history.

(56) References Cited

U.S. PATENT DOCUMENTS 4,924,522 A 5/1990 Bray et al.
5,035,500 A 7/1991 Rorabaugh et al.
(Continued)

FOREIGN PATENT DOCUMENTS

CA 2815461 A1 4/2012
CN 103261943 A 8/2013
(Continued)

OTHER PUBLICATIONS

Advisory Action, U.S. Appl. No. 17/248,049, May 2, 2022, 4 pages.
(Continued)

*Primary Examiner* — Nitin Patel
*Assistant Examiner* — Cory A Almeida
(74) *Attorney, Agent, or Firm* — Nicholson De Vos Webster & Elliott LLP; Judith Szepesi

(57) ABSTRACT

A head mounted display system to display an image, the head mounted display system comprising a display engine to generate light for a display, the system configured to color specific settings to one or more colors of the light. In one embodiment, the color specific settings comprises one or more of: colors having different resolutions, different focal distances, and different fields of view.

19 Claims, 15 Drawing Sheets

Related U.S. Application Data

(60) Provisional application No. 62/957,777, filed on Jan. 6, 2020.

(56) References Cited

U.S. PATENT DOCUMENTS

| | | |
|---|---|---|
| 6,008,781 A | 12/1999 | Furness et al. |
| 6,097,353 A | 8/2000 | Melville et al. |
| 6,275,326 B1 | 8/2001 | Bhalla et al. |
| 6,353,503 B1 | 3/2002 | Spitzer et al. |
| 6,356,392 B1 | 3/2002 | Spitzer |
| 6,411,751 B1 | 6/2002 | Giles et al. |
| 7,009,752 B1 | 3/2006 | Lorell et al. |
| 7,786,648 B2 | 8/2010 | Xu et al. |
| 8,203,702 B1 | 6/2012 | Kane et al. |
| 9,128,281 B2 | 9/2015 | Osterhout et al. |
| 9,335,548 B1 | 5/2016 | Cakmakci et al. |
| 9,588,408 B1 | 3/2017 | Linnell |
| 9,710,887 B1 | 7/2017 | Sahlsten et al. |
| 9,711,072 B1 | 7/2017 | Konttori et al. |
| 9,711,114 B1 | 7/2017 | Konttori et al. |
| 9,779,478 B1 | 10/2017 | Wilson et al. |
| 9,972,071 B2 | 5/2018 | Wilson et al. |
| 10,140,695 B2 | 11/2018 | Wilson et al. |
| 10,255,714 B2 | 4/2019 | Mitchell et al. |
| 10,284,118 B2 | 5/2019 | Henderson et al. |
| 10,504,207 B1 | 12/2019 | Wilson et al. |
| 10,514,546 B2 | 12/2019 | Eash et al. |
| 11,209,650 B1 | 12/2021 | Trail |
| 2002/0005976 A1 | 1/2002 | Behin et al. |
| 2008/0015553 A1 | 1/2008 | Zacharias |
| 2009/0122385 A1 | 5/2009 | Hilton |
| 2009/0160872 A1 | 6/2009 | Gibbons |
| 2009/0189830 A1 | 7/2009 | Deering et al. |
| 2010/0097580 A1 | 4/2010 | Yamamoto et al. |
| 2010/0149073 A1 | 6/2010 | Chaum et al. |
| 2010/0231706 A1 | 9/2010 | Maguire, Jr. |
| 2011/0075257 A1 | 3/2011 | Hua et al. |
| 2011/0141225 A1 | 6/2011 | Stec et al. |
| 2011/0285967 A1 | 11/2011 | Gollier |
| 2012/0120498 A1 | 5/2012 | Harrison et al. |
| 2012/0154277 A1 | 6/2012 | Bar-Zeev et al. |
| 2012/0176483 A1 | 7/2012 | Border et al. |
| 2013/0100176 A1 | 4/2013 | Lewis et al. |
| 2013/0114146 A1 | 5/2013 | Larson |
| 2013/0208003 A1 | 8/2013 | Bohn et al. |
| 2013/0208330 A1 | 8/2013 | Naono |
| 2013/0286053 A1 | 10/2013 | Fleck et al. |
| 2014/0049643 A1 | 2/2014 | Segerstrom et al. |
| 2014/0300859 A1 | 10/2014 | Oz |
| 2015/0173846 A1 | 6/2015 | Schneider et al. |
| 2015/0201171 A1 | 7/2015 | Takehana |
| 2015/0247723 A1 | 9/2015 | Abovitz et al. |
| 2015/0287165 A1 | 10/2015 | Berghoff |
| 2016/0026253 A1 | 1/2016 | Bradski et al. |
| 2016/0033771 A1 | 2/2016 | Tremblay et al. |
| 2016/0065921 A1 | 3/2016 | Sieler et al. |
| 2016/0077338 A1 | 3/2016 | Robbins et al. |
| 2016/0131912 A1 | 5/2016 | Border et al. |
| 2016/0209648 A1 | 7/2016 | Haddick et al. |
| 2016/0225192 A1 | 8/2016 | Jones et al. |
| 2016/0233793 A1 | 8/2016 | Henderson et al. |
| 2016/0240013 A1 | 8/2016 | Spitzer |
| 2016/0260258 A1 | 9/2016 | Lo et al. |
| 2016/0262608 A1 | 9/2016 | Krueger |
| 2016/0267716 A1 | 9/2016 | Patel |
| 2016/0274365 A1 | 9/2016 | Bailey et al. |
| 2016/0327789 A1* | 11/2016 | Klug ................. G02B 27/0101 |
| 2016/0363841 A1 | 12/2016 | Hino et al. |
| 2016/0379606 A1 | 12/2016 | Kollin et al. |
| 2017/0083084 A1 | 3/2017 | Tatsuta et al. |
| 2017/0124760 A1 | 5/2017 | Murakawa et al. |
| 2017/0188021 A1 | 6/2017 | Lo et al. |
| 2017/0245753 A1 | 8/2017 | Donaldson |
| 2017/0255012 A1 | 9/2017 | Tam et al. |
| 2017/0255020 A1 | 9/2017 | Tam et al. |
| 2017/0255766 A1 | 9/2017 | Kaehler |
| 2017/0263046 A1 | 9/2017 | Patney et al. |
| 2017/0287446 A1 | 10/2017 | Young et al. |
| 2017/0287447 A1 | 10/2017 | Barry et al. |
| 2017/0316601 A1 | 11/2017 | Kakarlapudi et al. |
| 2017/0318235 A1 | 11/2017 | Schneider et al. |
| 2018/0003962 A1 | 1/2018 | Urey et al. |
| 2018/0031849 A1 | 2/2018 | Omanovic et al. |
| 2018/0096471 A1 | 4/2018 | Wilson et al. |
| 2018/0136471 A1 | 5/2018 | Miller et al. |
| 2018/0136473 A1 | 5/2018 | Cobb et al. |
| 2018/0174451 A1 | 6/2018 | Rao |
| 2018/0183356 A1 | 6/2018 | Henderson et al. |
| 2018/0227630 A1 | 8/2018 | Sengelaub et al. |
| 2018/0267294 A1 | 9/2018 | Aschwanden et al. |
| 2018/0269266 A1 | 9/2018 | Ahmed et al. |
| 2018/0275410 A1* | 9/2018 | Yeoh .................... H04N 13/383 |
| 2018/0284451 A1* | 10/2018 | Eash ........................ G09G 5/00 |
| 2018/0293041 A1 | 10/2018 | Harviainen |
| 2018/0321484 A1 | 11/2018 | Bailey et al. |
| 2018/0344413 A1 | 12/2018 | Rappel et al. |
| 2019/0041524 A1 | 2/2019 | Korsgaard et al. |
| 2019/0049721 A1 | 2/2019 | Anton et al. |
| 2019/0179149 A1 | 6/2019 | Curtis et al. |
| 2020/0018965 A1 | 1/2020 | Milner-Moore et al. |
| 2020/0133006 A1 | 4/2020 | Eash et al. |
| 2020/0271932 A1 | 8/2020 | Tuomisto et al. |
| 2021/0293931 A1 | 9/2021 | Nemet et al. |

FOREIGN PATENT DOCUMENTS

| | | |
|---|---|---|
| CN | 107392989 A | 11/2017 |
| CN | 107852521 A | 3/2018 |
| CN | 108474949 A | 8/2018 |
| EP | 1970887 A1 | 9/2008 |
| GB | 2510001 A | 7/2014 |
| JP | 08-313843 A | 11/1996 |
| JP | 2001-281594 | 10/2001 |
| JP | 2007-171228 A | 7/2007 |
| JP | 2009-182754 A | 8/2009 |
| JP | 2014-511512 A | 5/2014 |
| JP | 2015-503934 A | 2/2015 |
| JP | 2017-028510 A | 2/2017 |
| JP | 2017-534075 A | 11/2017 |
| KR | 10-2017-0055992 A | 5/2017 |
| KR | 10-2018-0104056 A | 9/2018 |
| WO | 2009/131626 A2 | 10/2009 |
| WO | 2012/082807 A2 | 6/2012 |
| WO | 2013/035086 A1 | 3/2013 |
| WO | 2017/113117 A1 | 7/2017 |
| WO | 2018/019831 A1 | 2/2018 |
| WO | 2018/165484 A1 | 9/2018 |
| WO | 2018/175625 A1 | 9/2018 |
| WO | 2018/183405 A1 | 10/2018 |
| WO | 2019/104046 A1 | 5/2019 |

OTHER PUBLICATIONS

European Search Report and Search Opinion, EP App. No. 21738820.6, Nov. 29, 2023, 13 pages.

Final Office Action, U.S. Appl. No. 17/248,049, Feb. 15, 2022, 23 pages.

International Search Report and Written Opinion, PCT App. No. PCT/US21/70008, May 3, 2021, 10 pages.

Milanovic et al., "Sub-100 US Settling Time and Low Voltage Operation for Gimbal-less Two-Axis Scanners," IEEE/LEOS Optical MEMS 2004, Takamatsu, Japan, August (2004). (Year: 2004).

Non-Final Office Action, U.S. Appl. No. 17/248,049, May 25, 2022, 23 pages.

Non-Final Office Action, U.S. Appl. No. 17/248,049, Sep. 8, 2021, 25 pages.

Notice of Allowance, U.S. Appl. No. 17/248,049, Dec. 7, 2022, 9 pages.

Notice of Allowance, U.S. Appl. No. 17/248,049, Dec. 19, 2022, 2 pages.

(56) References Cited

OTHER PUBLICATIONS

Supplementary Partial European Search Report and Search Opinion, EP App. No. 21738820.6, Jul. 4, 2023, 13 pages.

* cited by examiner

HEAD MOUNTED SYSTEM WITH COLOR SPECIFIC MODULATION

RELATED APPLICATIONS

The present application is a continuation of U.S. application Ser. No. 17/248,049, filed Jan. 6, 2021, issuing as U.S. Pat. No. 11,624,921 on Apr. 11, 2023, which application claims priority to U.S. Provisional Application No. 62/957,777 filed on Jan. 6, 2020, both of which are incorporated by reference in their entirety.

FIELD OF THE INVENTION

The present application relates to head mounted displays, and more particularly to color specific modulation in head mounted displays.

BACKGROUND

There is a need for low-weight low-power head mounted displays (HMD). The core challenge is creating a high resolution, full color, large field of view (FOV), low power, high heat dissipation display that can be comfortably worn on the head. To maintain a high resolution (pixel per degree or PPD) over a large field of view, displays with large numbers of pixels are generally required. For instance, 60 pixels per degree is at the limit of the angular resolution of the typical human eye. To provide enough pixels for a head mounted display with a field of view of 40° horizontal (H) by 40° vertical (V), at 60 pixels per degree, requires a display resolution of 2400×2400 pixels, or 5.76 Megapixels per eye. A display panel with this resolution is typically very large because individual pixels have a minimum size. This requires compromises in the industrial design of the head mounted display. The display panel also requires a lot of power to drive the pixels and perform the computation for each pixel value at the frame rates for head mounted displays. The tradeoffs get worse as the field of view gets larger.

The field of view of a typical human eye is 135° H by 180° V, but the eye cannot resolve 60 pixels per degree across this field of view. The field of view where the eye can resolve maximum acuity is typically 30° H by 30° V and maximally 70° H by 55° V. The maximal case would require a display panel with a resolution of 4,200×3,300, or ~14 Megapixels just to cover the high resolution area of the FOV of the eye. To cover the peripheral space beyond that would require even more pixels, and thus more space, computation, and power. With current technology, the display size and power requirements make comfortable, attractive form factors impossible.

BRIEF DESCRIPTION OF THE FIGURES

The present invention is illustrated by way of example, and not by way of limitation, in the figures of the accompanying drawings and in which like reference numerals refer to similar elements and in which.

DETAILED DESCRIPTION OF THE INVENTION

Figure 1:
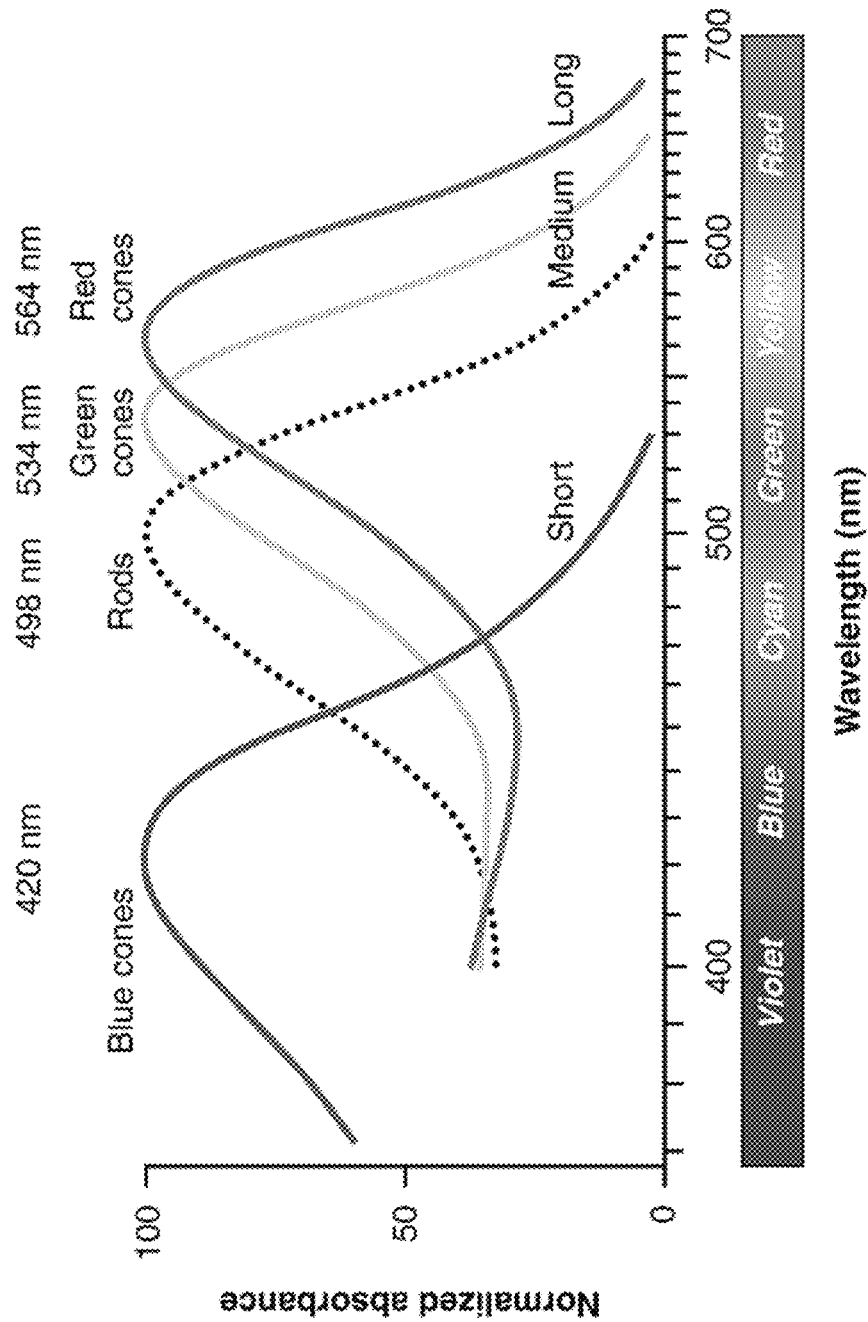
FIG. 1 illustrates one embodiment of spectral responses to various colors.

By optimizing the design of head mounted displays (HMD) to take advantage of the way human color vision works, HMDs can be made smaller, lighter, and more efficient without compromising resolution or field of view. In one embodiment, the system applies color specific modulation based on visual perception of wavelength, such that visual information is treated differently based on its color/wavelength. The system applies settings to one color channel to alter its format. In one embodiment, the settings applied to a subset of colors alter its resolution, focal distance, field of view, and/or foveation. In one embodiment, this change is applied to the green color channel. In one embodiment, the change is applied to another subset of colors. In one embodiment, the visual information comprises an alteration of focal distance, field of view, and/or pixel density by color. Other changes to one or two of the three colors in a display may be applied. In one embodiment, the wavelength based modulation takes advantage of the color perception of the human eye to create a display that has an improved quality, reduced cost, reduced power consumption, and/or reduced weight.

This improved HMD structure and design utilizes optical elements and color encoding in a new way, which reduces the size, power (battery), and processing requirements, and the heat around the user's head while retaining the perceived pixel density (PePD) or visual acuity of the images. This improved design can be used with either a virtual reality (VR) system, an augmented reality (AR) system, or any other mixed reality or "XR" system in which virtual objects are generated and displayed.

One way to address the issues of HMDs is by using dynamic foveated displays. Dynamic foveated displays take advantage of the fact that the eye can only sense at its highest resolution within the foveal region, which is only a few degrees wide near the center of the field of view. The resolving power of the eye drops off very quickly, to ½ resolution at ~2.5° away from the center, all the way to ~1/15 at the edge of the field of view. Dynamic foveated displays place the high resolution image portion where the eye is looking. In this way, they are able to reduce the total number of pixels needed by many orders of magnitude to cover the full field of view of an eye. By further considering the structure of the color sensing of the human visual system, high resolution displays can be designed to be even more compact and efficient.

For most people, the eye's pixel resolution is higher for the green/yellow spectrum, and lower for the red and blue portions of the spectrum. In one embodiment, the system displays a higher resolution image in the green/yellow colors than the red/blue colors. This results in the eye perceiving a higher resolution image, because most of the sensors near the fovea are sensitive to green/yellow. In one embodiment, this color compression of the data stream reduces the amount of data that is processed and displayed and can also simplify the optics used.

Having diffractive optical elements with different pixel resolutions for different colors, designed to produce full color images, is an unexpected redesign with many benefits, such as lower cost, lighter weight, and reduced power consumption. This results in enabling smaller batteries, longer runtimes, and/or lower heat dissipation needs for head mounted displays.

In one embodiment, the system splits the focal distance by color, with a red/green combiner at a first focal distance, and a blue/green combiner at a second focal distance. In one embodiment, the combiners are waveguides. This permits the use of a system with two combiners (red/green and blue/green) instead of six combiners to provide a multi-focal display. It is well known in the art that a combiner design must transmit three colors, for a full color image to be perceived. Having combiners with only a subset of the three colors at different distances, designed to produce full color multifocal images, is an unexpected redesign with many benefits, such as lower cost, lighter weight, and reduced power consumption for longer runtimes for head mounted displays.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized, and that logical, mechanical, electrical, functional and other changes may be made without departing from the scope of the present invention. The following detailed description is, therefore, not to be taken in a limiting sense, and the scope of the present invention is defined only by the appended claims.

Human Color Vision System

Rods and cones are the two main photoreceptor cells in the eye that make sight possible. Rods are very sensitive to light and will respond to a single photon, however, they provide no information about color to the brain; color information is provided by the cones. Each cone has a wavelength sensitive pigment that has a specific spectral response. There are three types of cones in a typical human eye: short (S), medium (M), and long (L).

FIG. 1 illustrates a typical spectral response of the rods and cones of an eye. The short pigment's peak response is at shorter wavelengths in the blue portion of the color spectrum, the medium pigment's peak response is at medium wavelengths at the high end of the green portion of the spectrum, and the long pigment's peak response is at longer wavelengths near the yellow-orange portion of the spectrum. The spectral response from each cone is broad and there is significant overlap, especially between the medium and long cones. This means that there is a section of wavelengths from the short green section to the yellow portion of the visible spectrum that will stimulate both medium and long cones, but not the short cones. The spatial distribution of each type of cone can be used to design a more efficient, lighter, cheaper head mounted display.

The back of the retina in the highest resolution area, the fovea, includes three types of cones: long cones are red, medium cones are green, and short cones are blue. There are significantly fewer short cones than medium and long cones in the fovea. The typical ratio of M+L cones to S cones is ~14:1. Most of the resolving power of the eye comes from the light sensed by medium and long cones because their spatial density is so much higher, with the more sporadically spaced S cones providing spectral information at the smaller end of the visible range.

The improved HMDs described in this application can leverage how the eye works to overcome existing industry challenges.

Micro Displays

Typical displays create a color image by blending the light from separate color sources to create all of the colors in the display. In one embodiment, a typical display uses one red (R) source, one blue (B) source, and one (sometimes two) green (G) source. These sources can be light emitting diodes (LEDs), microLEDs, lasers, a scanning laser, a single light source and a rapidly rotating wheel with sections of different color filters, etc.

In one embodiment, a group of RGB light sources, and/or a single mirror in a digital micromirror device (DMD), are used to display one pixel. The light from each of these sources stimulates the cones and rods in the eye according to the spectral response of the pigment for each of those sensors. The vision system translates the response of the cones into the millions of colors a typical human can see. Different hues are created by setting different output intensities for each of the individual colors. The intensity of each color is encoded with a certain bit-precision. For 3-bit color, 8 levels of each color can be chosen for 512 distinctive colors. On modern displays, this is typically extended to 16.7 million colors by assigning 8-bits to each color channel. A typical way to do this is to give 256 levels of color intensity to the three color channels: 8-bits ($2^8$=256) for red, blue and green. This results in $256^3$=16.8 Million color combinations. There are many other ways to encode color data into digital values, such as YUV and its variants. Although the present application discusses using RGB light, one of skill in the art would understand that other ways of encoding color data may be used, without departing from the present invention.

Combining these encoding approaches with the optical architectures listed below would yield further savings in compute power, video bandwidth requirements, and therefore the power consumption, overall size, weight and the industrial design of a product.

Figure 2:
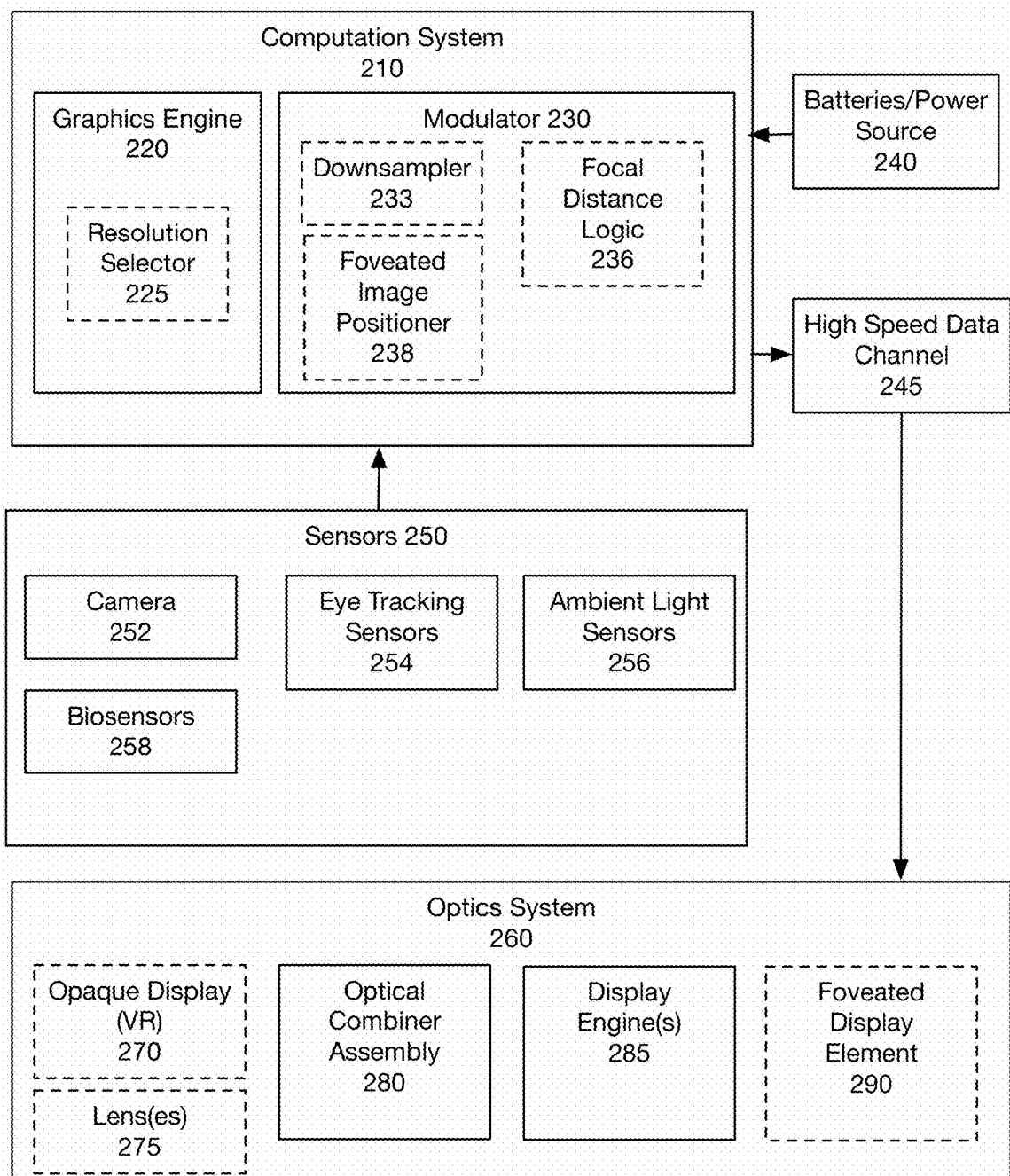
FIG. 2 is a block diagram of one embodiment of the system.

FIG. 2 is a block diagram of one embodiment of the head mounted display system.

The generation of the virtual image created by a head mounted display 200 starts in the computation system 200. This system 200 can be a desktop computer with a video card or a system on a chip that includes a processor and graphics processor, similar to those used in cell phones, or a cloud-based system in which distributed computers provide the processing. The graphics engine 220 in some embodiments takes in data from sensor inputs 250, such as cameras 252, eye-tracking sensors 254, ambient light sensors 256, and biosensors 258, to encode the appropriate color for each individual pixel into an array of values that constitute one frame of data. The graphics engine 220 in one embodiment generates pixel data for all three color values. In one embodiment, graphics engine 220 includes resolution selector 225, to select the resolution for each of the colors. In one embodiment, the resolution may differ by color. In another embodiment, one color may have a higher resolution than the other colors. In one embodiment, the higher resolution color is green.

The system in one embodiment includes a modulator 230 which modulates a portion of the light from the graphics engine 220. The modulation may be to alter the resolution, focal distance, and/or foveation. In one embodiment, the modulation may be part of the graphics engine 220. The computation system 210 provides the settings for the light data, which may include one or more of: the resolution, focal position for a foveated image, focal distance, and field of view for each of the colors.

In one embodiment, the green light, which is perceived at the highest resolution by the human eye has the highest resolution, while blue and red light have a lower resolution. In one embodiment, this may be achieved by using a down sampler 233 to down-sample the blue and red light. In another embodiment, the resolution selector 225 in the graphics engine 220 may be a separate light engine for the first subset of light, which is at a higher resolution than the image data generated for the remaining portion of the light.

In one embodiment, the modulation comprises the positioning of a foveated image, using foveated image positioner 238. In one embodiment, the foveated image positioner 238 utilizes data from sensors 250 to position the foveated image for the user.

In one embodiment, a subset of the light may have a different focal distance. For example, the green light may be at a near distance, while the red and blue light are at an infinite focal distance. Alternatively, red/green may be at one focal distance, while blue/green are at another focal distance. The focal distance logic 236 selects the focal distance for each of the colors.

In one embodiment, the system includes a subset of the colors of the light which is altered. Thus, in one embodiment, the settings for the light may alter its foveated position, focal distance, field of view, and/or resolution, by color. However, in one embodiment, the remaining unaltered light, may include all colors as well.

This data is sent over a high-speed data channel 245 from the computation system 210 to the optics system 260. Computing the pixel values and encoding them into this array must be done very quickly to prevent simulator sickness in VR/AR and to present an object locked to the real world in AR. Frame rates are typically around 90 Hz, or a new frame every 0.011 seconds. This computation is an intensive process that uses a lot of energy and generates a lot of heat. Both of these are challenges for a mobile HMD because batteries 240 to provide the necessary power are heavy and heat around the user's head is uncomfortable.

Reducing the computation requirements reduces power consumption, and thus allows a smaller battery size, making the headset lighter and more comfortable, and reduces the generated heat, lowering the thermal dissipation requirement. But reducing computational requirements is in direct conflict with other system preferences, like high resolution and large field of view, both of which traditionally have been accomplished by adding more pixels. The total pixel count increases with the area of the FOV, which causes the total pixel count to increase to levels that are impractical to drive in a head mounted display because they require too much computing power and substantially increase the display panel size. To understand more of the system optimization tradeoffs, more detail in the optical architectures for virtual and augmented reality HMDs is helpful.

Optical Elements of an HMD

A virtual reality (VR) HMD blocks out the light from the real world and presents an entirely virtual reality to the user. The optical architecture of a VR display is, in simple terms, an opaque display 270, such as an organic light emitting diode array, with a magnifying lens 275 in front of it. VR HMD's are usually very large because they have a large FOV and need a lot of pixels to create even a blocky image for the user. A large number of pixels requires a large display, with a lot of computing power, which requires a lot of energy to drive.

An augmented reality (AR) HMD creates a virtual image that mixes with incoming light and augments what a user would already see in the world. The optical design of an AR system is more complicated than VR because it combines the virtual image with the real image of the world. This can be accomplished many ways. In one way, the system uses cameras to capture the light coming from the real world, then combines that with the AR images in the graphics processing unit, which is then displayed in the HMD. This is referred to as a passthrough AR. Another way is to combine the photons from the real world directly with the generated AR images using a transparent optical combiner, such as a waveguide, birdbath partial mirror, or holographic optical element. This is deferred to as a see-through AR.

The optics system 260 may include an opaque virtual reality (VR) display 270 or may include lenses 275 to enable an augmented reality (AR) display. In one embodiment, the AR system is a see-through system in which the display elements are transparent so that the real world can be perceived directly. The optics system includes optical combiner assembly 280 which includes one or more optical combiners. The optical combiners, in one embodiment, are one or more waveguides. The optical combiner assembly 280 directs the light to the user's eye. In one embodiment, the system includes one or more display engines 285. In one embodiment, the optical combiner assembly 280 may determine the focal distance for the portion of the light that utilizes the optical combiner. Thus, with two or more optical combiners, the light may be shown at two or more focal distances. The display engines 285 generate the light which is passed through the optical combiner(s). In one embodiment, the system may include a foveated image, which is a smaller image with a higher resolution. For such configurations, foveated display element 290 is provided to move the foveated display within the field of view, to position it. Other elements such as positioning mirrors and lenses may be used, as is known in the art.

Waveguides are one kind of optical combiner that is used to mix the virtual image of the head mounted display with other light. In an AR system, that light is mixed with light coming from the real world. In a VR system, that light could be mixed with another opaque display, such as an OLED or LCD panel. One or more waveguides which transmit data associated with a single pixel may be referred to as a waveguide assembly, or optical combiner assembly 280. While the present system generally is discussed with a waveguide, one of skill in the art would understand that other optical combiners may be used, in any of the below embodiments.

The above benefits, due to lower resolution requirements apply to such alternative optical combiners as well. For example, optical combiners may include reflective holographic optical elements (HOEs), curved mirrors, computational holographic displays, birdbath optics including a semi-transparent mirror and beam splitter, or other designs. For these types of optical combiners as well, the reduction in resolution provides flexibility in tolerances, weights, and materials used. Thus, one of skill in the art would understand that the present improvement may be utilized with any type of optical combiner assembly 280, not just waveguides.

A VR System Using an Optical Combiner

In a standard VR system using an optical combiner, the source display is coupled into the waveguide of optical material by an input coupler. The light rays bounce inside the optical material because their angle is less than the critical angle for that material. This is known as total internal reflection (TIR). The light rays continue to travel via TIR down the waveguide until they interact with an out-coupler that causes the light rays to leave the waveguide and go towards the user's eye. There may be other elements inside a waveguide to move the light in other directions to make the eyebox of the system larger. These are known as eyebox expanders. In-couplers, out-couplers, and eye box expanders are referred to as diffractive optical elements (DOEs).

Many different structures and materials can be used as DOEs in a waveguide. Surface relief gratings are one type of DOE structure. Surface relief gratings have very small grooves and are placed in the areas to diffract light in a different direction. These gratings can be made, for example, by nano-imprinting polymer on top of an optical substrate, they can be etched directly into the substrate, or they can be made in many other ways. The gratings can be perpendicular to the surface of the waveguide, or they can be slanted. The gratings can be pillars or grooves. Another way to make DOEs is with holographic films. These films can be polymers that have been exposed to create diffraction sites inside the polymer. When the films are laminated to the waveguide in the in-coupling, expander, or outcoupling regions, the light diffracts off of the sites, turning it in the necessary direction to TIR down the waveguide or be presented to the eye.

The use of various types of DOEs is known in the art. Other methods of making DOEs in a waveguide or optical combiner may be used.

To maintain high resolution of the final image sent to the user, tight tolerances are required for the flatness of waveguide; for instance, a thickness variation of the material less than 1 μm and the warp is less than 5 μm, is used, in one embodiment. These tight tolerances increase the production cost of the materials for waveguides. If the resolution requirements for the waveguide are lower, the waveguide may have looser tolerances. In one embodiment, for the lower resolution colors, the waveguide may have thickness variation less than 4 μm and warp less than 20 μm. In one embodiment, other materials, such as plastic rather than glass, and other manufacturing methods, such as injection molding, can be used to make the waveguide for lower resolutions. Thus, by having some of the waveguides as lower-resolution waveguides, the overall product cost can be lowered and/or the product may be made be lighter because of the increased flexibility for the waveguide for lower resolutions. In one embodiment, the system may also enable the use of magnification to reduce pixel density, as will be described below.

Minimizing the number of individual waveguides is advantageous because it reduces the cost, complexity, and weight, and will increase the transparency of the HMD.

Multi-Resolution Waveguides

A multiresolution optical combiner assembly provides data at two or more resolutions, based on wavelength. That is, the resolution of the image presented in one color will be different than the resolution presented in a different color. In one embodiment, because human eyes perceive green colored data at a higher resolution, the highest resolution portion of the image is in the green wavelength range.

In one embodiment, a higher resolution single color display engine is combined with a lower resolution display of the other colors. In one embodiment, the higher resolution single color display engine is foveated, meaning it is directed to the user's fovea. In one embodiment, the combination provides the perception that the system has the field of view of the VR display and the resolution of the single color display engine.

In one embodiment, the red and blue channels are presented with a first, lower resolution, while the green channel is presented at a second, higher resolution to the user. Despite the lower resolution of two of the three channels, the perceived resolution is the resolution of the green channel. In one embodiment, the lower resolution is 5-40 pixel per degree (PPD), and the higher resolution is 30-60 ppd.

In another embodiment, the blue, red, and green channels are each presented at different resolutions, from lowest to highest. In one embodiment, the blue channel is presented at the lowest resolution (5-20 ppd), the red channel is presented at an intermediate resolution (10-40 ppd), and the green channel is presented at the highest resolution (30-120 ppd).

To generate the multi-resolution display, in one embodiment, separate display engines are used for each color. In one embodiment, there are three different display engines 285, one for each color, each one with a different resolution and optionally a different field of view. In one embodiment the resolutions correspond to the resolution ranges above. In one embodiment, each single-color light engine directs its image to an in-coupling grating that is not in the path of any other color. In another embodiment, the three displays are combined together into one image using optical elements, such as an X-cube or X-plate, or other arrangements of dichroic mirrors, or other optical elements, and that image is sent to an optical combiner. In another embodiment, two display panels may be used, one for red and blue, having the same resolution, and one for green with a higher resolution. In another embodiment, a single three color display engine may be used. In one embodiment, the output of a display engine may be separated for input to different optical combiners. The configuration of the display engines, whether one, two, or three display engines are used, is not determinative. It may be altered in any of the configurations below.

In one embodiment, the initial image has the resolution of the green channel, and the red and blue channels are down-sampled (reducing the pixel count of a frame) while the green channel is kept at a high resolution. In one embodiment, the down-sampling is in the range of ⅙-⅚ of the green channel resolution. In one embodiment, the red and blue channels are down-sampled at the same rate. Alternatively, they may be down-sampled at different rates. This reduces the computing power needed to generate each frame, and the power used to present the image to the user.

Other ways of generating a lower resolution red/blue and/or higher resolution green image data may be used. In one embodiment, the resolution of the red/blue channels resolution is reduced by increasing the magnification, and thus having larger pixels (e.g. fewer pixels per degree). In one embodiment, this may be used to increase the field of view of the red/blue channels, providing a larger field of view with the same display engine. In one embodiment, the magnification may be differential magnification, such that the magnification level varies by distance from the fovea/image focus.

Figure 3:
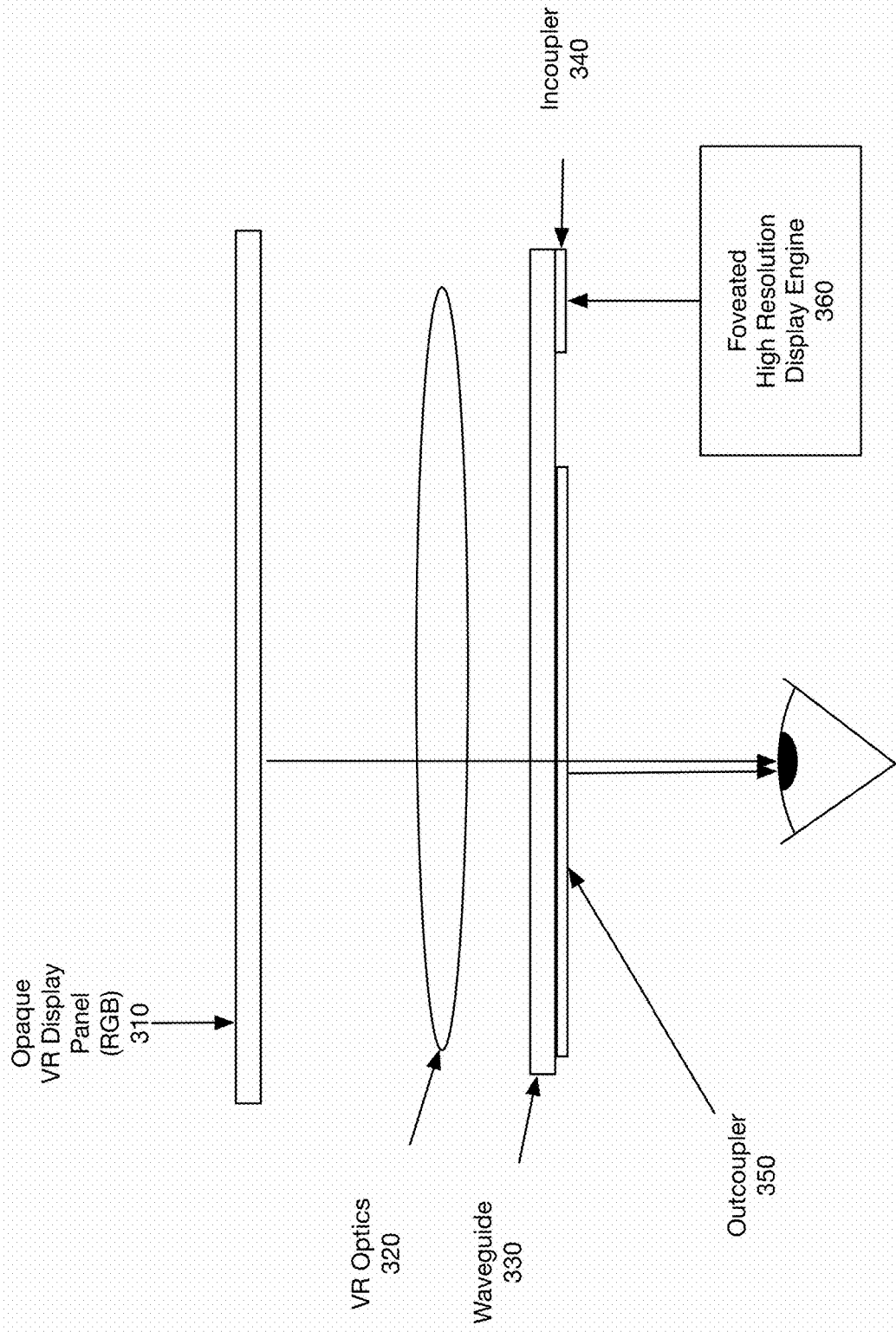
FIG. 3 illustrates one embodiment of a virtual reality (VR) HMD system, in which one or more colors are displayed using a VR display in combination with a separate display engine for one or more higher frequency colors.

FIG. 3 illustrates one embodiment of a VR HMD which has a microdisplay, such as a virtual reality display panel 310, which in one embodiment is an OLED panel, with a lower resolution array of LEDs which is combined with a higher resolution display 360. For simplicity, this illustration shows only one eyebox, and a single light ray. One of skill in the art would understand that this is a simplification to make the figure easier to understand.

In one embodiment, a waveguide 330 or other optical combiner projects images from the higher resolution single-color pixels 360. The images from the panel 310 pass through VR optics 320. In one embodiment the light from the panel 310 passes through waveguide 330, but is not directed along the waveguide 330.

In one embodiment, the lower resolution array of the RGB OLED 310 includes two of the three colors. In one embodiment, the colors of the lower resolution array of the OLED are only red and blue.

In another embodiment, the lower resolution array of the OLED 310 may be a standard three color OLED, and the system sets the green channel to not send data. In one embodiment, the high resolution single color display 360 is green. In another embodiment, the higher resolution color is another color wavelength that substantially stimulates both the M and L cones. In one embodiment, the color is yellow or orange. Having a lower resolution display for at least some of the colors reduces the overall HMD power consumption and weight because there are fewer total pixel values to compute, while the perceived resolution is high because of the higher resolution of the green image displayed through the waveguide 330. In one embodiment, the higher resolution single color display engine has a resolution of 40-60 ppd.

The high resolution image from display engine 360 is coupled into the waveguide 330 through in-coupler 340, and out-coupled through out-coupler 350. In one embodiment, the high resolution image sent through the waveguide 330 is dynamically foveated. Dynamic foveation targets a high resolution image to the user's fovea, which has the highest perceived resolution. By having a high resolution image that is foveated, the system can reduce the field of view of the high resolution image, which lowers the pixel count of the high resolution image, while maintaining the perceived resolution at the high resolution level. The reduced field of view reduces the power consumption while maintaining high perceived resolution over the entire field of view. In one embodiment, when the high resolution image is dynamically foveated, the opaque VR display panel 310 provides a separate field image that is also displayed. In this embodiment, the field (or lower resolution) image also includes the green channel. Thus, in one embodiment, the green waveguide transmitting the high resolution foveated image also includes the lower resolution OLED image outside the foveal area. In another embodiment, the VR display panel 310 includes green for the field image area. In one embodiment, the field display may have a cutout for the foveated display area. One embodiment of implementing such a foveated image display is described in U.S. Pat. No. 10,514,546, issued on Dec. 24, 2019, which is incorporated herein by reference.

Figure 4:
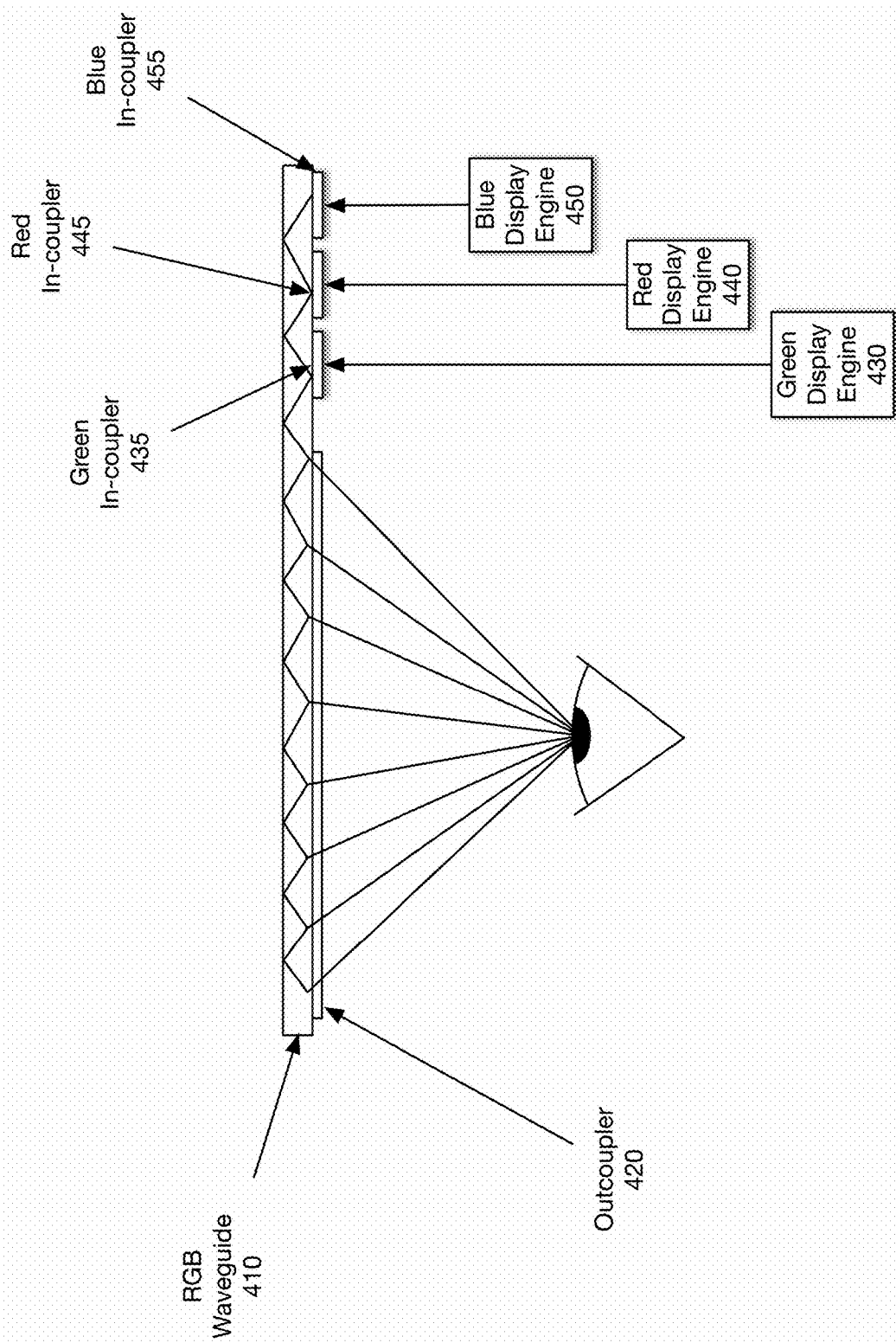
FIG. 4 illustrates one embodiment of a system in which a single optical propagator is used with separate display engines.

FIG. 4 illustrates one embodiment of system in which a single optical propagator is used with separate display engines. The system includes three separate display engines 430, 440, 450. In one embodiment, the light output by each of the different display engines 430 may have different resolutions. In another embodiment, the light from the green display engine 430 has a higher resolution than the light output of the red display engine 440 and blue display engine 450.

The system includes a waveguide 410, which includes in-couplers 435, 445, 455 for each of the display engines. In one embodiment, the in-couplers do not overlap, and are physically displaced from each other. The waveguide 410 includes a single out-coupler 420, in one embodiment. In one embodiment, the waveguide 410 is optimized for the green light. Waveguides 410 may be optimized for certain frequency ranges. In one embodiment, the waveguide 410 is optimized for the green channel.

Figure 5:
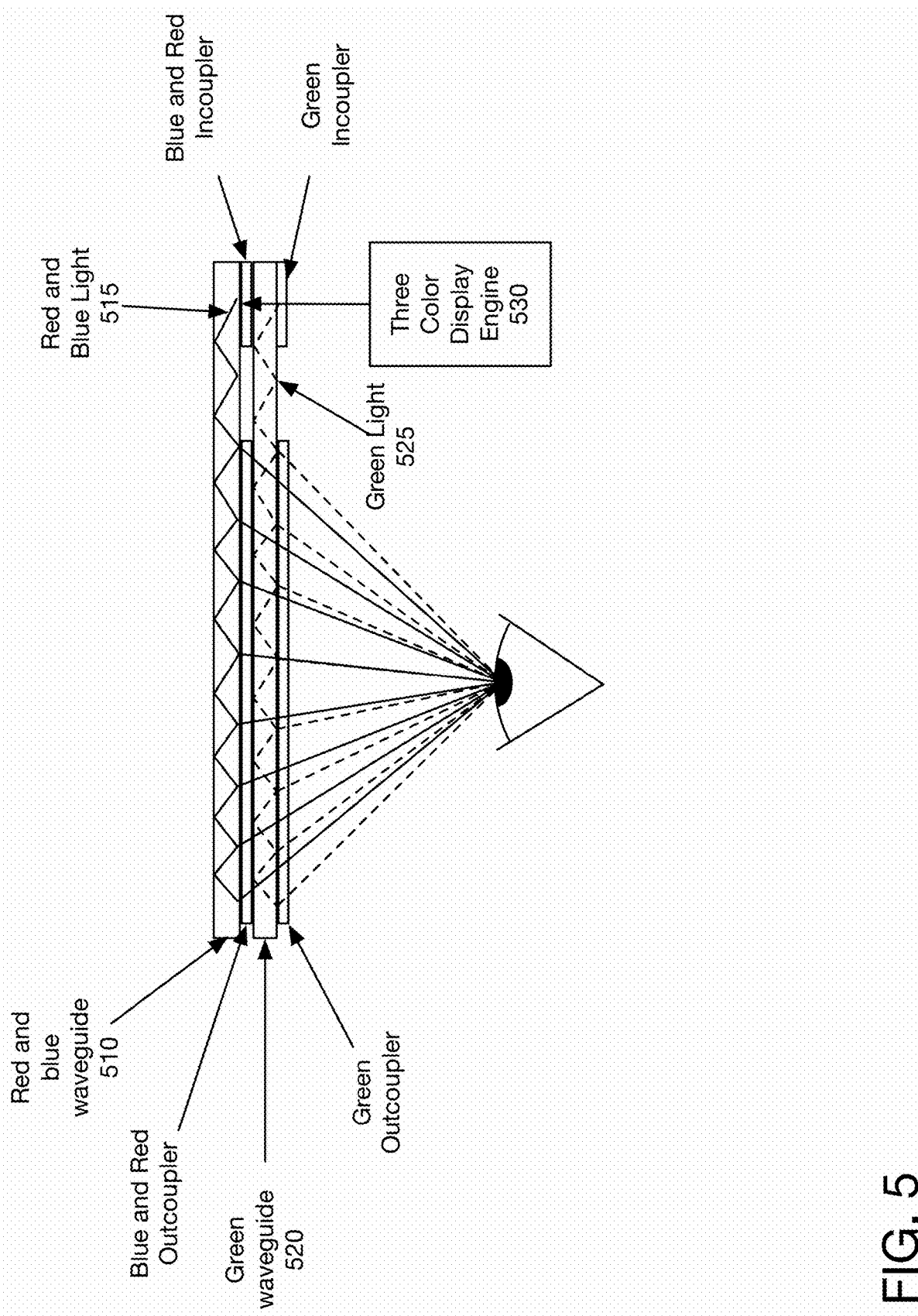
FIG. 5 illustrates one embodiment of an augmented reality (AR) HMD, in which one or more colors use a first optical propagator, while one or more higher frequency colors use a second optical propagator.

FIG. 5 illustrates one embodiment of an augmented reality (AR) head mounted device (HMD), in which one or more colors use a first waveguide 510, while one or more higher frequency colors use a second waveguide 520. In one embodiment, the red and blue color information 515 is presented through the first waveguide 510 at a lower resolution and the green color information 525 is presented through the second waveguide 520 at a higher resolution. By putting a majority of the image spatial information into a green channel that stimulates both the M and L cones, and leaving the red and blue channels at a lower resolution, the structure of the image comes from the green channel 525 and the rest of the color gamut comes from the lower resolution blue and red channels 515. This lowers the total pixel count, lowering the power requirement and thus the weight and expense of creating an HMD. However, because of how the eye perceives images, the perceived resolution of the resulting image is similar to the higher resolution of the green channel. In one embodiment, a three color display engine 530 may generate the image data for both the red and blue light 515 and the green light 525. The appropriate waveguide is selected based on frequency. In one embodiment, a single display engine 530 may be used, and the system can separate the outputs by frequency (wavelength). In another embodiment, the in-couplers for the waveguides 510, 520 are frequency selective, and in-couple the appropriate color channels.

In one embodiment, the color channels with lower resolution, typically red and blue, can be sent through cheaper, lower quality waveguides with the green light sent through a waveguide 520 with better imaging capabilities. In one embodiment, the waveguides for the lower resolution colors are made of plastic. In one embodiment the waveguides for the color channels with the lower resolution are made from glass with looser flatness specifications.

In some embodiments, the green light is dynamically foveated, as discussed above.

Figure 6A:
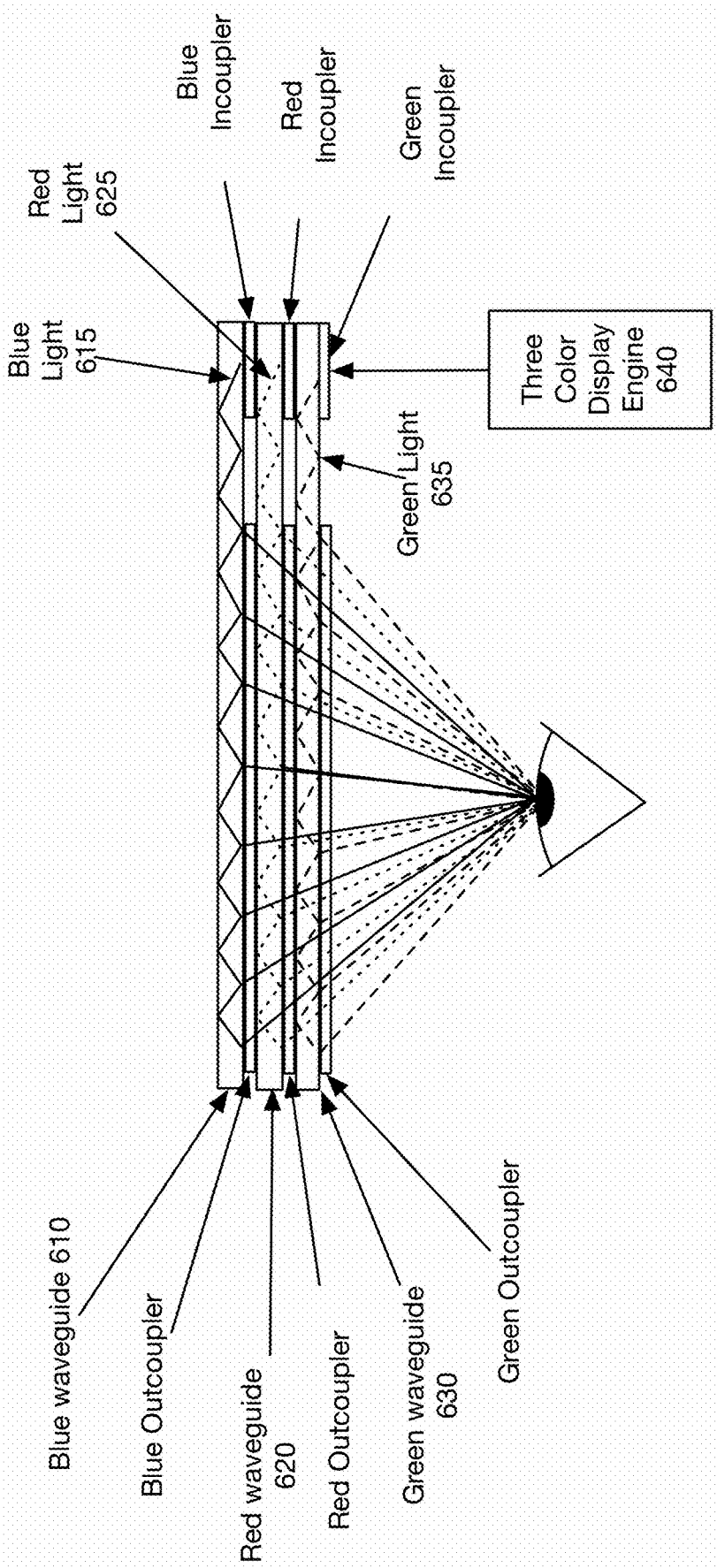
FIG. 6A illustrates one embodiment of a three-propagator configuration, in which each color has a separate optical propagator.

In another embodiment, illustrated in FIG. 6A, rather than presenting the red and blue data in a single waveguide, three waveguides are used, one for each color. The high resolution green data is presented in one waveguide 630, and the red and blue data are presented in separate waveguides 620, 610. In one embodiment, in this configuration, the red and blue light may have different resolutions. In one embodiment, red light 625 is medium resolution, and the blue light 615 is low resolution. In one embodiment, a three color display engine 640 is used. Each of the waveguides has a separate in-coupler. In one embodiment, the in-couplers are color-selective, such that each set of wavelengths is coupled into the appropriate waveguide. This improves on current products because cheaper, lighter, lower quality imaging materials can be used for the red and blue waveguides, such as plastic.

Figure 6B:
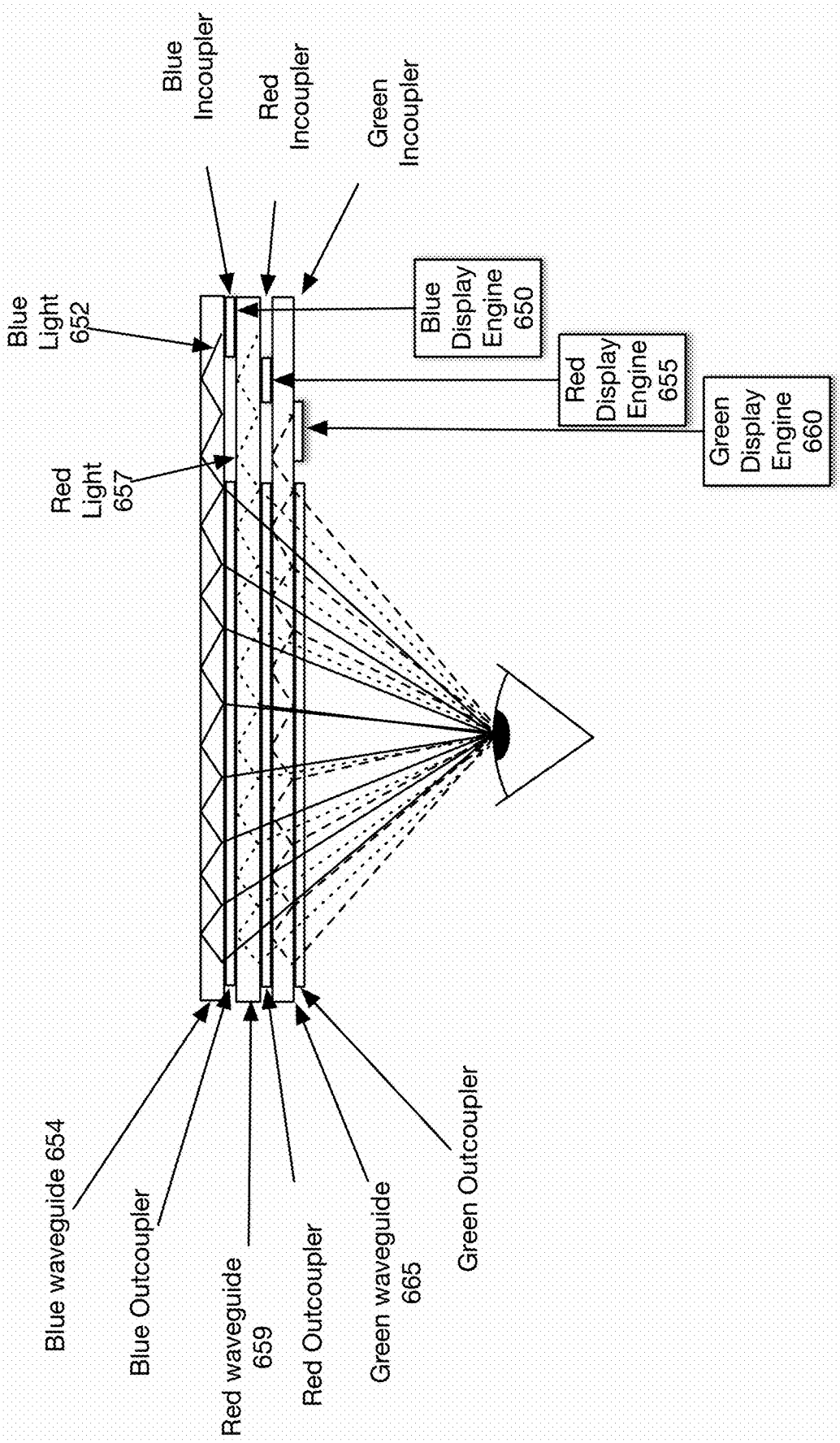
FIG. 6B illustrates one embodiment of a three-propagator configuration, in which each color has a separate display engine and optical propagator.

FIG. 6B illustrates one embodiment of a three-propagator configuration, in which each color channel has a separate display engine 650, 655, 660 and optical propagator 654, 659, 665. The three waveguide system utilizes separate display engines 650, 655, 660, for each of the colors. The in-couplers for each of the colors are displaced with respect to each other. Having separate display engines enables the green display engine 660 to be a higher resolution, different focal distance, or be foveated.

Figure 6C:
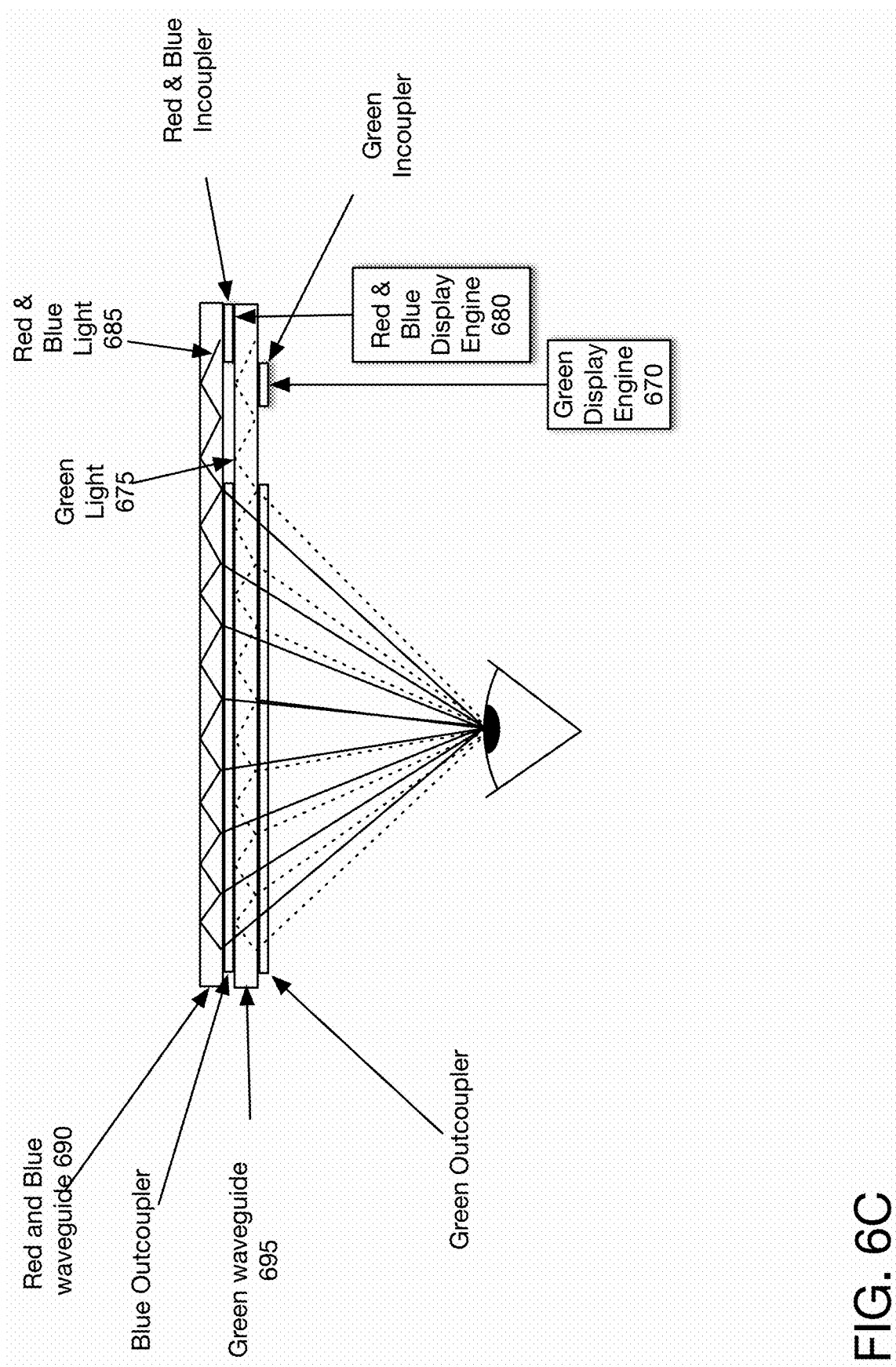
FIG. 6C illustrates one embodiment of a two-propagator configuration, in which each optical propagator has an associated display engine.

FIG. 6C illustrates one embodiment of a two-propagator configuration, in which each optical propagator has an associated display engine. In this configuration, there is a green display engine 670 and a blue/red display engine 680. This allows adjustment of the resolution of the green channel 675 compared to the red/blue light 685. Furthermore, the quality of the green waveguide 695 may be higher than the quality of the red/blue waveguide 690.

Multi-Focal Waveguides

The problem compounds when the focus of light is considered. The human eye can change its focal depth by distorting its lens; this is called accommodation. For head mounted displays, the accommodation distance needs to match the distance of the gaze point, which is the point at which the gaze vectors from both eyes intersect in space. When these depths don't match there is a vergence-accommodation conflict that causes headaches and other adverse physiological effects. If the head mounted display can only display virtual objects at one focal distance, the range at which these objects can be displayed needs to be severely limited so as not to cause a vergence-accommodation conflict.

Generally, the out-coupler of a waveguide creates a virtual image at an infinite focus. In one embodiment, optical power can be added to the out-coupler to change the focal point from infinity to bring it closer to the head, however, this change has to be applied to each out-coupler and is fixed for that waveguide. In another embodiment, an optic is put between the out-coupler and the eye to move the focus in. In this case, a compensating optic is required on the far side of the waveguide such that the light from the real world isn't affected by the thin-lens. One way to provide a multifocal display is to use two sets of waveguides, one set for RGB at one focal point and another set for RGB at a different focal point. However, this doubles the total waveguide count and increases system complexity as well as weight.

In one embodiment, the present system includes two or more waveguides which have different focal distances.

Figure 7:
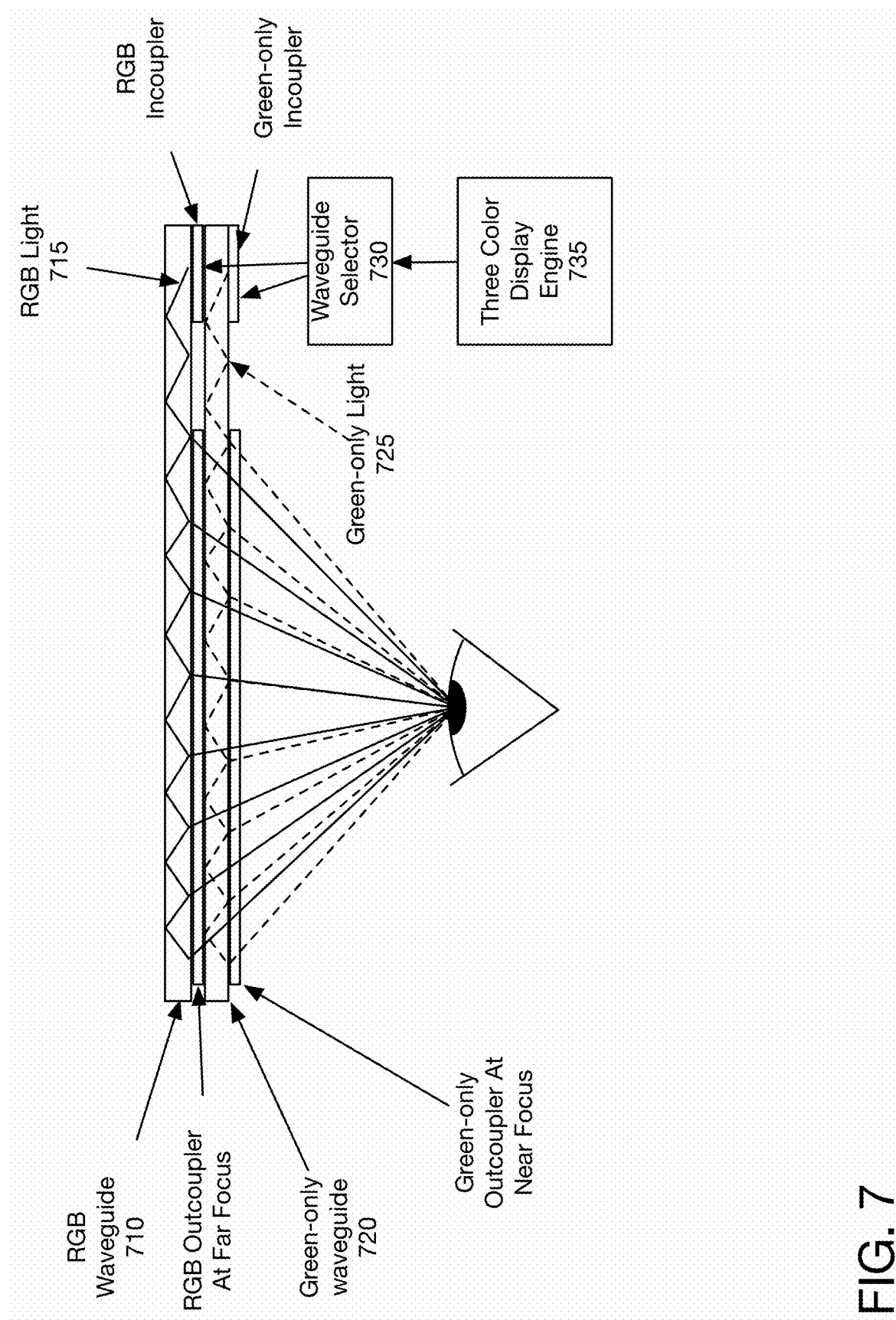
FIG. 7 illustrates one embodiment of a multi-focal waveguide in which a green-only waveguide provides a second focal distance.

FIG. 7 illustrates one embodiment in which a first waveguide 710 guides RGB light 715 at a far focus and a second waveguide 720 guides green-only light 725 at a near focus. In one embodiment, the RGB far focus light is focused in the range of 0.5-∞ meters, and the green-only near focus light is focused at a distance within the range of 0.25-1 meters. In one embodiment, because green light is present in both waveguides 710, 720, a waveguide selector 730 directs the light to the appropriate waveguide. In one embodiment, the waveguide selector 730 may use polarization to guide a portion of the green light to the RGB waveguide 710 and to the green-only waveguide 720.

Figure 9:
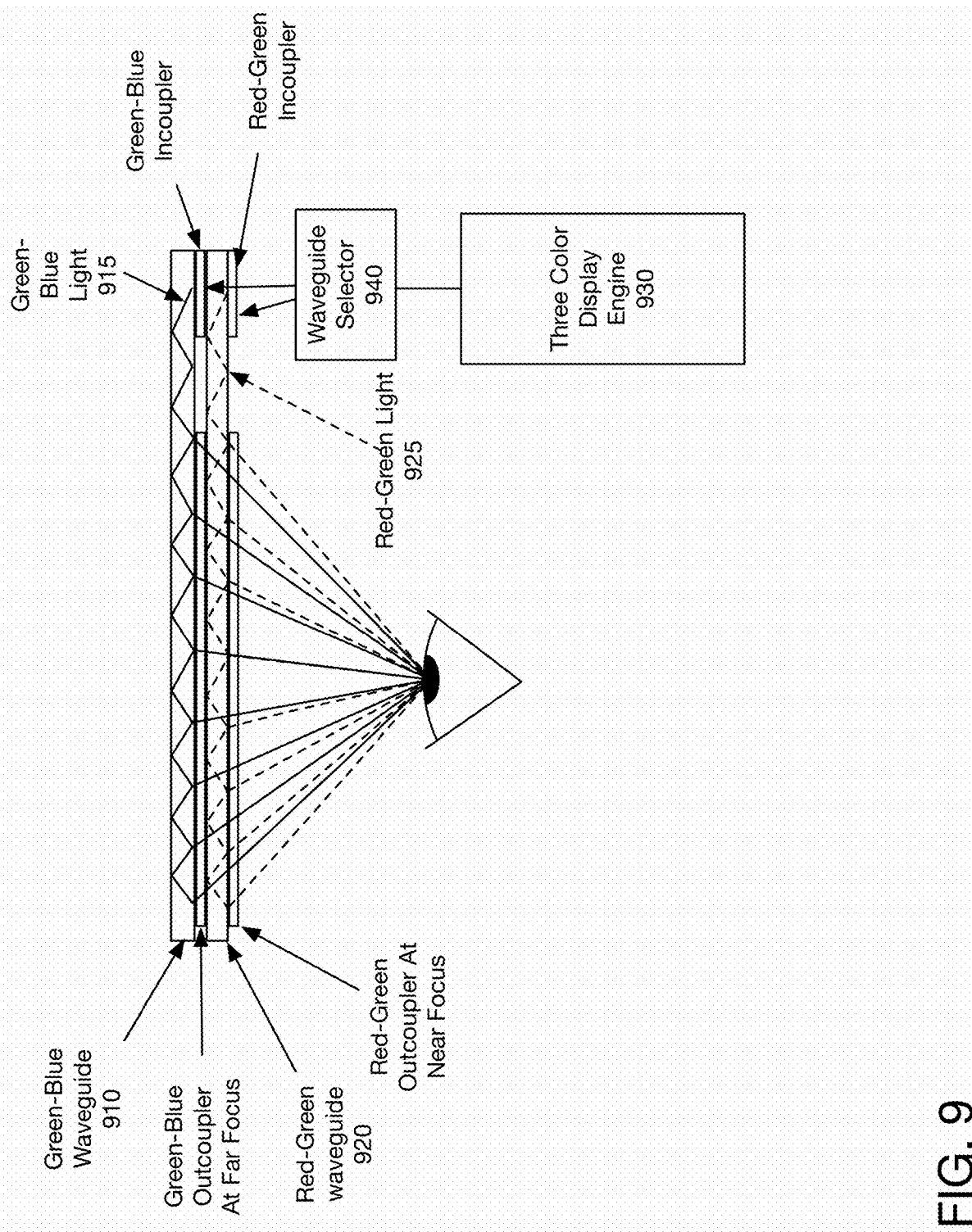
FIG. 9 illustrates another embodiment of a multi-focal waveguide in which a red-green waveguide and a blue-green waveguide are used.

FIG. 9 illustrates one embodiment in which a first waveguide 910 guides the blue and green light 915 of the image and creates a virtual image that is focused at a further Z distance. The second waveguide 920 guides red and green light 925 and is focused at a nearer Z distance. In one embodiment, the further (blue green) Z distance is in the range of 0.5-∞ meters, and the nearer (red green) Z distance is in 0.25-1 meter. In one embodiment, a waveguide selector 940 may use optical techniques, such as polarization control, to cause the light to couple into only one of the two waveguides. In one embodiment, the waveguide selector 940 is a beam splitter. In one embodiment, a color filter is used to cause the light to couple into the appropriate waveguide. In one embodiment, the color filter is a reflective filter. In one embodiment, the display engine 930 alternates displaying red-green frames and blue-green frames and the waveguide selector 940 is a time based selector.

Figure 8:
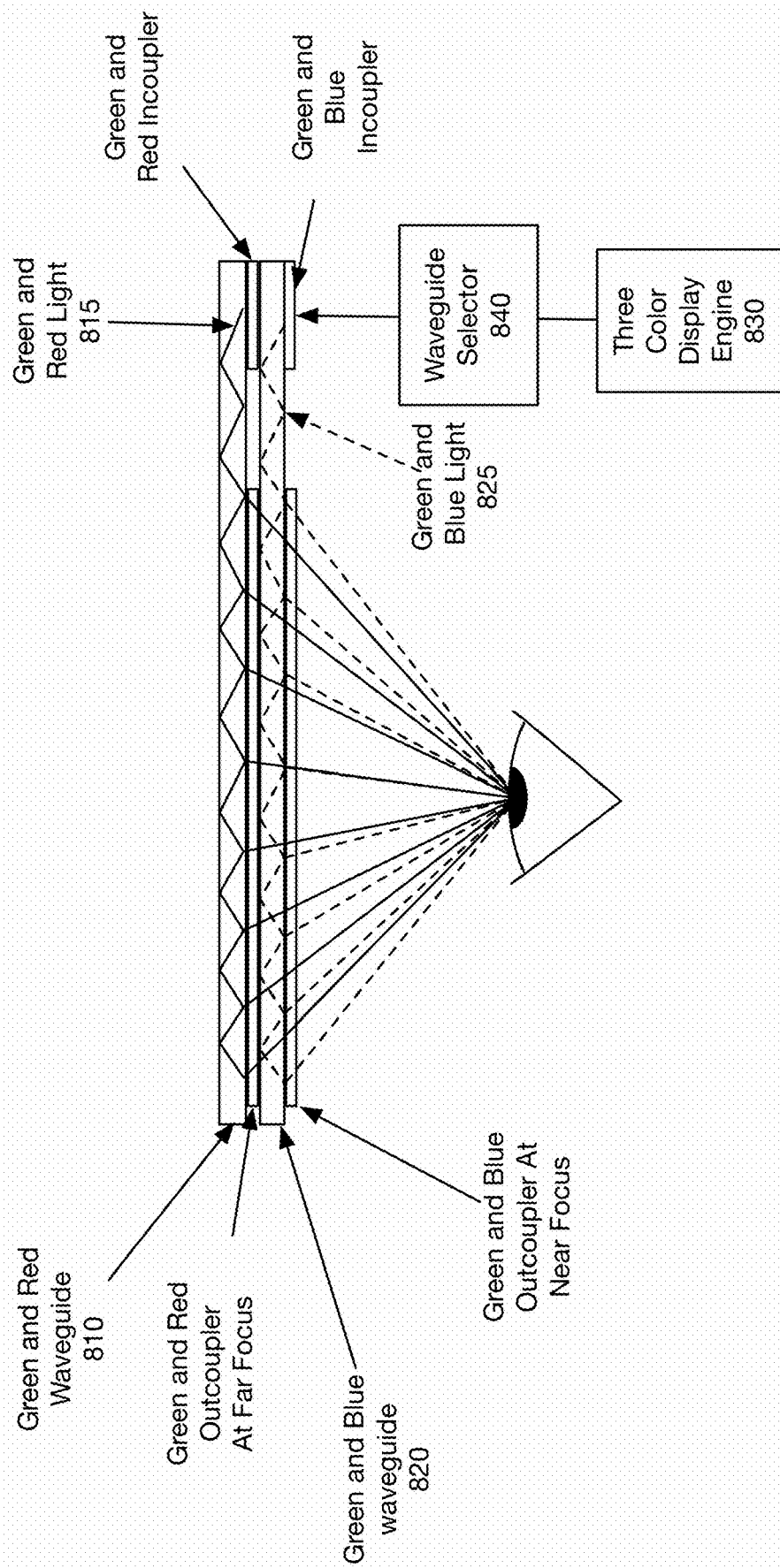
FIG. 8 illustrates one embodiment of a multi-focal waveguide in which a red-green waveguide and a blue-green waveguide are used.

In another embodiment, shown in FIG. 8, the red-green and blue-green waveguides are switched such that the waveguide displaying the image data nearer to the user is the blue-green waveguide and the waveguide for the image data further away is the red-green waveguide.

Figure 10:
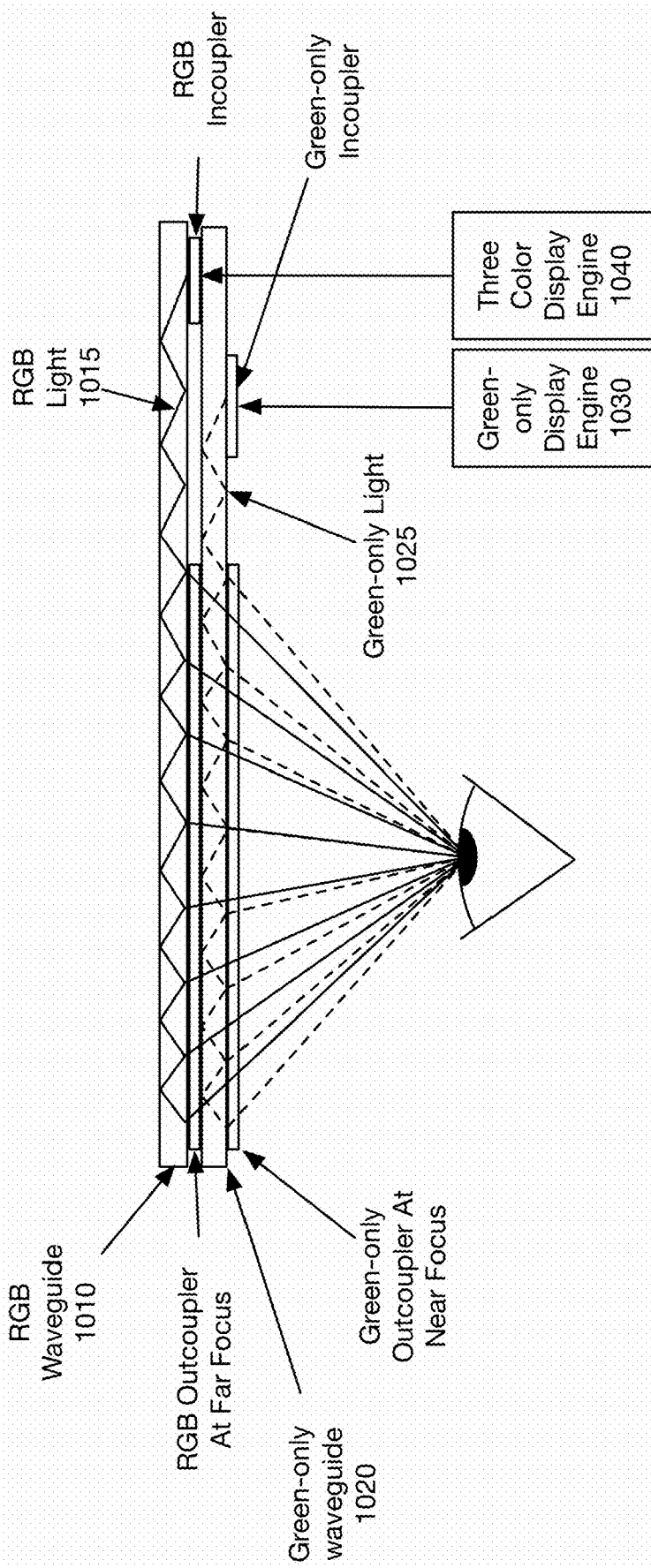
FIG. 10 illustrates one embodiment of a multi-focal waveguide in which separate inputs that are not in-line are used.

In one embodiment, illustrated in FIG. 10, there is a waveguide with R, G, and B 1010 displaying data at a first farther focal length at a distance within the range of 0.5-∞ meters and another green-only waveguide 1020 displaying data at a second nearer focal length a distance within the range of 0.25-1 meters. In one embodiment, the display data for the RGB light 1015 is produced by three color display engine 1040, while the display data for the green-only light 1025 is produced by green-only display engine 1030. In one embodiment, the image for the green-only display engine 1030 is dynamically foveated. In one embodiment, the RGB display engine 1040 is foveated. In one embodiment, both display engines are foveated. In one embodiment, more waveguides that are focused at different distances are combined to produce more than two focal lengths, e.g. 3 waveguides could provide focal planes within the ranges of: 0.5-∞ meters, 0.25-1 meter, and 0.1-0.5 meter. Each focal plane has at least one wavelength in high resolution, in one embodiment this wavelength is green, to provide the spatial information at that focal plane. Some of the other focal lengths will have other colors to provide the color information of the image.

In the embodiment illustrated in FIG. 10, the pupils are spatially separated. That is, the in-coupler for the first waveguide 1010 is spatially separated from the in-coupler for the second waveguide 1020.

Multi FOV Waveguides

The human visual system senses colors differently across the field of view (FOV) of the eye, because the distribution of pigmented cones varies across the field of view. The design of the optical combiner assembly can take this distribution into account in order to create large fields of view with lower total color pixel count. For instance, the medium and long cones are found in high concentrations near the fovea. The region outside the fovea is dominated by rods and short cones. In one embodiment, one waveguide could carry green and red light over the field of view that is scanned by the fovea of a rotating eyeball, minimally 30 H by 30 V degrees up to 70 H by 55 V degrees, and another waveguide could display blue light over a much larger field of view, up to 135 H by 180 V degrees to create the perception of a FOV of 135 H by 180 V degrees, but with fewer overall pixels.

Figure 11:
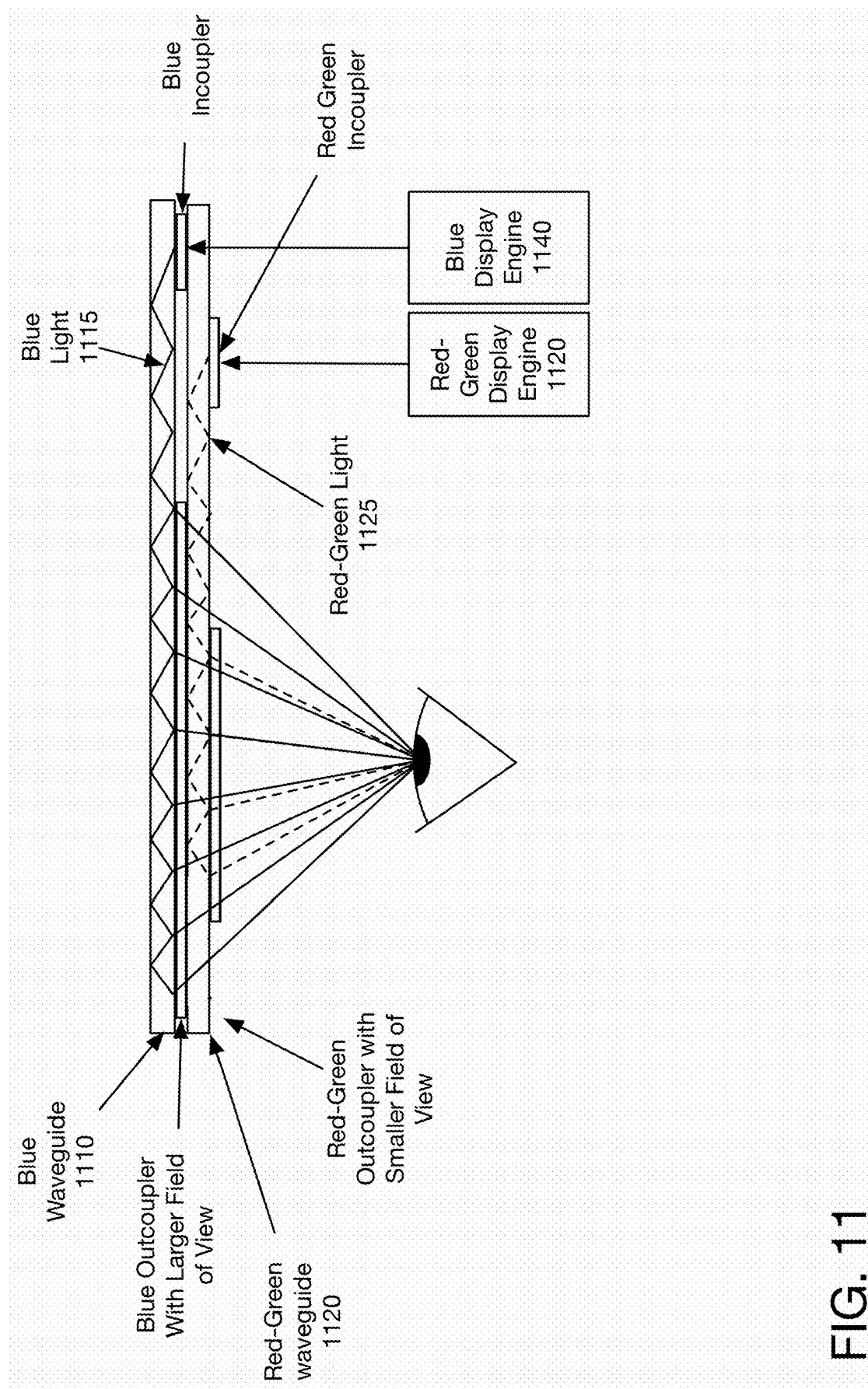
FIG. 11 illustrates one embodiment of a multi-FOV waveguide.

FIG. 11 illustrates one embodiment of a multi-FOV display, in which a red-green waveguide 1120 outputs red and green light 1125 with a smaller field of view than the blue light 1115 output by blue only waveguide 1110. In this configuration, the in-couplers for the color channels are spatially separated. In one embodiment, the resolution of the blue channel is lower than the resolution of the red and green channels.

Figure 12:
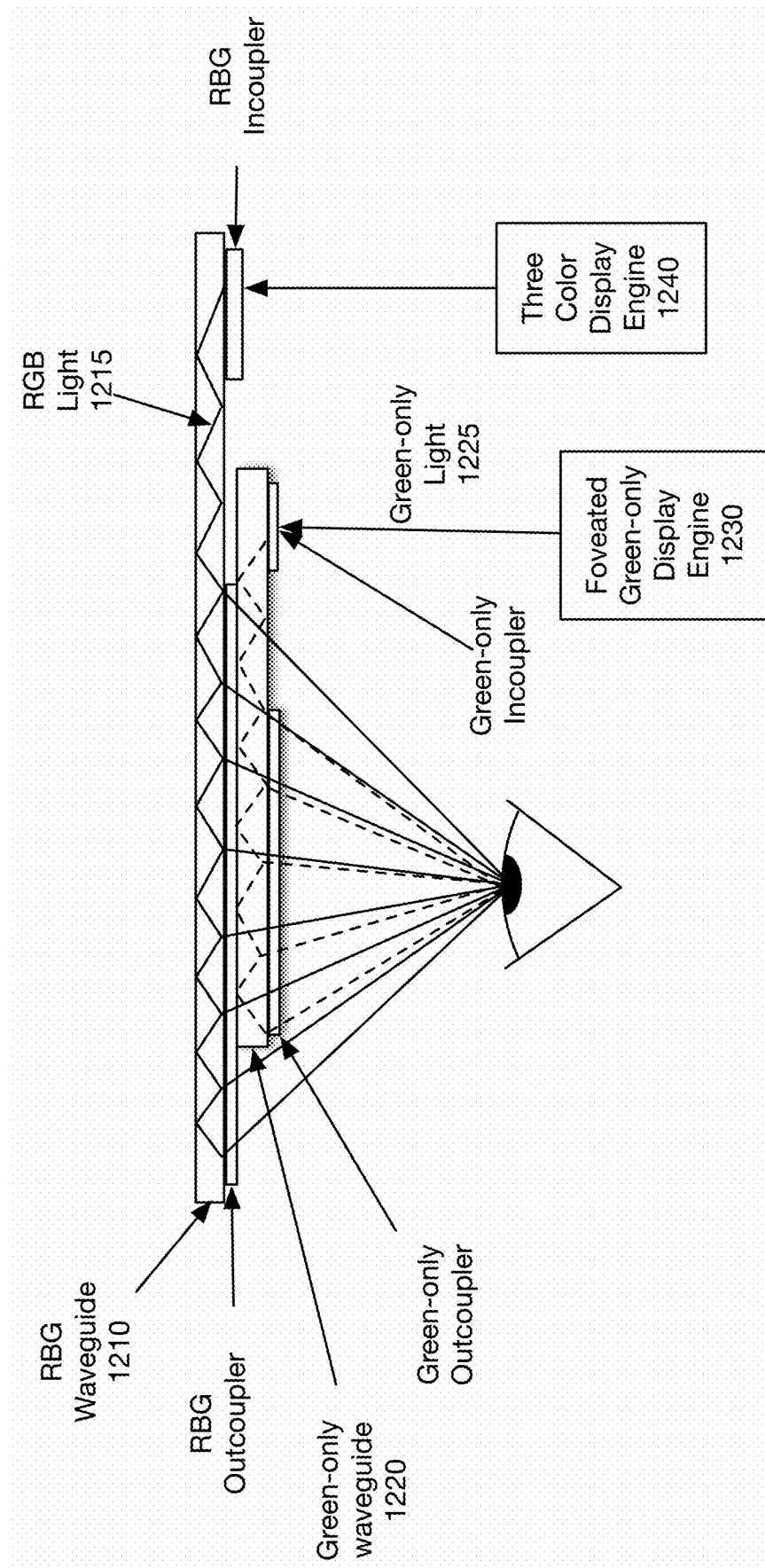
FIG. 12 illustrates another embodiment of the multi-FOV display.

FIG. 12 illustrates another embodiment of the multi-FOV display in which an RGB waveguide 1210 outputs red, blue, and green light 1215 from three color display engine 1240, with a larger field of view, and lower resolution than a green-only display 1230 through green-only waveguide 1220. In this configuration, the waveguides are different sizes, with the green-only waveguide 1220 a smaller size. In one embodiment, the in-couplers are different sizes as well. In one embodiment, the in-coupler for the green light 1225 is smaller than the RGB in-coupler. In one embodiment, the in-coupler for the green-only waveguide 1220 is also smaller than the out-coupler of the RGB waveguide 1210. In various combinations, the relative sizes of the waveguides, in-couplers, and out-couplers may differ between the waveguides.

Figure 13:
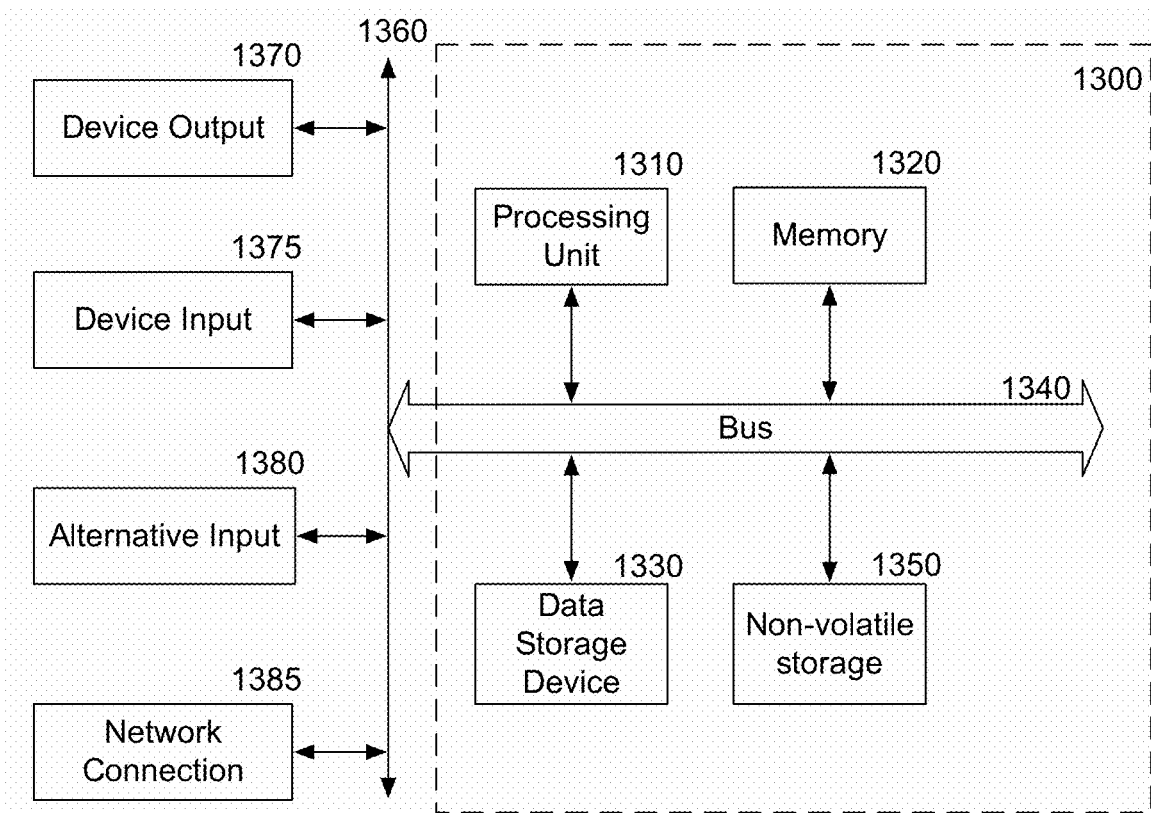
FIG. 13 is a block diagram of one embodiment of a computer system that may be used with the present invention.

FIG. 13 is a block diagram of a particular machine that may be used with the present invention. It will be apparent to those of ordinary skill in the art, however that other alternative systems of various system architectures may also be used.

The data processing system illustrated in FIG. 13 includes a bus or other internal communication means 1340 for communicating information, and a processing unit 1310 coupled to the bus 1340 for processing information. The processing unit 1310 may be a central processing unit (CPU), a digital signal processor (DSP), or another type of processing unit 1310.

The system further includes, in one embodiment, a random access memory (RAM) or other volatile storage device 1320 (referred to as memory), coupled to bus 1340 for storing information and instructions to be executed by processor 1310. Main memory 1320 may also be used for storing temporary variables or other intermediate information during execution of instructions by processing unit 1310.

The system also comprises in one embodiment a read only memory (ROM) 1350 and/or static storage device 1350 coupled to bus 1340 for storing static information and instructions for processor 1310. In one embodiment, the system also includes a data storage device 1330 such as a magnetic disk or optical disk and its corresponding disk drive, or Flash memory or other storage which is capable of storing data when no power is supplied to the system. Data storage device 1330 in one embodiment is coupled to bus 1340 for storing information and instructions.

The system may further be coupled to an output device 1370, such as a cathode ray tube (CRT) or a liquid crystal display (LCD) coupled to bus 1340 through bus 1360 for outputting information. The output device 1370 may be a visual output device, an audio output device, and/or tactile output device (e.g. vibrations, etc.)

An input device 1375 may be coupled to the bus 1360. The input device 1375 may be an alphanumeric input device, such as a keyboard including alphanumeric and other keys, for enabling a user to communicate information and command selections to processing unit 1310. An additional user input device 1380 may further be included. One such user input device 1380 is cursor control device 1380, such as a mouse, a trackball, stylus, cursor direction keys, or touch screen, may be coupled to bus 1340 through bus 1360 for communicating direction information and command selections to processing unit 1310, and for controlling movement on display device 1370.

Another device, which may optionally be coupled to computer system 1300, is a network device 1385 for accessing other nodes of a distributed system via a network. The communication device 1385 may include any of a number of commercially available networking peripheral devices such as those used for coupling to an Ethernet, token ring, Internet, or wide area network, personal area network, wireless network or other method of accessing other devices. The communication device 1385 may further be a null-modem connection, or any other mechanism that provides connectivity between the computer system 1300 and the outside world.

Note that any or all of the components of this system illustrated in FIG. 13 and associated hardware may be used in various embodiments of the present invention.

It will be appreciated by those of ordinary skill in the art that the particular machine that embodies the present invention may be configured in various ways according to the particular implementation. The control logic or software implementing the present invention can be stored in main memory 1320, mass storage device 1330, or other storage medium locally or remotely accessible to processor 1310.

It will be apparent to those of ordinary skill in the art that the system, method, and process described herein can be implemented as software stored in main memory 1320 or read only memory 1350 and executed by processor 1310. This control logic or software may also be resident on an article of manufacture comprising a computer readable medium having computer readable program code embodied therein and being readable by the mass storage device 1330 and for causing the processor 1310 to operate in accordance with the methods and teachings herein.

The present invention may also be embodied in a handheld or portable device containing a subset of the computer hardware components described above. For example, the handheld device may be configured to contain only the bus 1340, the processor 1310, and memory 1350 and/or 1320.

The handheld device may be configured to include a set of buttons or input signaling components with which a user may select from a set of available options. These could be considered input device #1 1375 or input device #2 1380. The handheld device may also be configured to include an output device 1370 such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above, such as a kiosk or a vehicle. For example, the appliance may include a processing unit 1310, a data storage device 1330, a bus 1340, and memory 1320, and no input/output mechanisms, or only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism. In one embodiment, the device may not provide any direct input/output signals, but may be configured and accessed through a website or other network-based connection through network device 1385.

It will be appreciated by those of ordinary skill in the art that any configuration of the particular machine implemented as the computer system may be used according to the particular implementation. The control logic or software implementing the present invention can be stored on any machine-readable medium locally or remotely accessible to processor 1310. A machine-readable medium includes any mechanism for storing information in a form readable by a machine (e.g. a computer). For example, a machine readable medium includes read-only memory (ROM), random access memory (RAM), magnetic disk storage media, optical storage media, flash memory devices, or other storage media which may be used for temporary or permanent data storage. In one embodiment, the control logic may be implemented as transmittable data, such as electrical, optical, acoustical or other forms of propagated signals (e.g. carrier waves, infrared signals, digital signals, etc.).

The present application describes and illustrates various embodiments of the system. The number of display engines, number of waveguides, and colors adjusted may be varied without departing from the scope of the present invention. Furthermore, the settings of the color channels may include any combination of differences in resolution, field of view, focal distance, and foveation. Additionally, the system may modify the generated blue, red, and/or green channels, to create the difference in the settings between the color channels, without departing from the scope of the invention. Also, the configurations illustrated herein may be mixed and matched. Thus, the system may include one or more waveguides, one or more display engines, and separate the color channels into any combination of one, two and/or three colors, and remain within the scope of the present disclosure.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A head mounted display system to display an image, the head mounted display system comprising:
   a display engine to generate light for an image for display;
   the system configured to apply color specific settings to a first subset of colors of the light, such that the first subset of colors has different settings than a second subset of colors of the light, such that the image has at least two different pixel resolutions for different subsets of colors within the image; and
   an optical combiner to output one or more colors of light to generate the image, the optical combiner comprising:
      a first waveguide to output the first subset of the colors of light to generate an image for display; and
      a second waveguide to output the second subset of the colors of light to generate the image;
      wherein the second waveguide has greater tolerance of thickness variation and warp than the first waveguide.

2. The head mounted display system of claim 1, wherein the first subset of colors comprises green light, and the green light has a higher resolution than red light and blue light.

3. The head mounted display system of claim 2, further comprising:
   the first waveguide to output green light, the green light having a first resolution; and
   the second waveguide to output red light, the red light having a second, lower resolution.

4. The head mounted display system of claim 3, further comprising:
   a third waveguide to output blue light, the blue light having a third, lowest resolution.

5. The head mounted display system of claim 3, wherein blue light is passed through the second waveguide.

6. The head mounted display system of claim 1, wherein the first waveguide and the second waveguide are made of different materials.

7. The head mounted display system of claim 1, wherein green light has a closer focal distance than red light and blue light.

8. The head mounted display system of claim 1, wherein the first waveguide and the second waveguide are different materials.

9. The head mounted display system of claim 1, wherein green-blue light is displayed at a first focal distance, and red-green light is displayed at a second focal distance.

10. The head mounted display system of claim 1, wherein the display engine comprises:
    a first display engine to generate a foveal image with the first subset of colors; and
    a second display engine to generate a field display.

11. The head mounted display system of claim 10, wherein the first subset of colors comprises a green color channel, and the field display comprises red, blue, and green channels.

12. A head mounted display system to display an image, the head mounted display system comprising:
    a display engine to generate light for an image for display, the light including red light, blue light, and green light;
    the system configured to apply a color specific field of view to the green light, such that the green light has different field of view (FOV) than another portion of the light, such that the image has at least two FOVs; and
    an optical combiner to output one or more colors of light to generate a multi-FOV image, wherein the optical combiner comprises:
       a first waveguide to output a first subset of colors of light to generate an image for display; and
       a second waveguide to output a second subset of the colors of light to generate the image;
       wherein the second waveguide has greater tolerance of thickness variation and warp than the first waveguide.

13. The head mounted display system of claim 12, wherein the optical combiner comprises:
    a first waveguide to output a first subset of colors of light to generate an image for display; and
    a second waveguide to output a second subset of the colors of light to generate the image;
    wherein the first waveguide and the second waveguide are different materials.

14. The head mounted display system of claim 13, wherein the different materials are glass and plastic.

15. The head mounted display system of claim 14, wherein the first waveguide to output the green light is glass, and the second waveguide to output the another portion of the light is plastic.

16. A head mounted display system to display an image to a user comprising:
- a display engine to generate light, the light having a plurality of colors to display the image, a first color portion of the image generated by the display engine having a first characteristic and a second color portion of the image generated by the display engine having a second characteristic;
- an optical combiner to receive modulated light from a display system, the optical combiner comprising:
    - a first waveguide to output a first subset of colors of light to generate an image for display; and
    - a second waveguide to output a second subset of the colors of light to generate the image;
    - wherein the second waveguide has greater tolerance of thickness variation and warp than the first waveguide.

17. The head mounted display system of claim 16, wherein the first waveguide outputs green light.

18. The head mounted display system of claim 16, wherein the first waveguide is a different material than the second waveguide.

19. The head mounted display system of claim 18, wherein the first waveguide is glass, and the second waveguide is plastic.

\* \* \* \* \*